US011981545B2

(12) United States Patent
Maier et al.

(10) Patent No.: US 11,981,545 B2
(45) Date of Patent: May 14, 2024

(54) CABLE GUIDE APPARATUS, POWER SUPPLY SYSTEM AND METHOD FOR CONNECTING A LINE CABLE TO THE CONNECTING APPARATUS

(71) Applicant: Conductix-Wampfler GmbH, Weil am Rhein (DE)

(72) Inventors: Bernd Maier, Schliengen (DE); Dietmar Lang, Schliengen (DE); Martin Nöltner, Lörrach-Haagen (DE); Frank Kreiter, Malsburg (DE)

(73) Assignee: Conductix-Wampfler GmbH, Weil am Rhein (DE)

( * ) Notice: Subject to any disclaimer, the term of this patent is extended or adjusted under 35 U.S.C. 154(b) by 1337 days.

(21) Appl. No.: 16/478,298

(22) PCT Filed: May 3, 2018

(86) PCT No.: PCT/EP2018/061357
§ 371 (c)(1),
(2) Date: Jul. 16, 2019

(87) PCT Pub. No.: WO2018/206392
PCT Pub. Date: Nov. 15, 2018

(65) Prior Publication Data
US 2019/0367334 A1 Dec. 5, 2019

(30) Foreign Application Priority Data
May 9, 2017 (DE) .................... 10 2017 109 990.5

(51) Int. Cl.
*B66C 13/12* (2006.01)
*B66C 19/00* (2006.01)
(Continued)

(52) U.S. Cl.
CPC ............ *B66C 13/12* (2013.01); *B66C 19/002* (2013.01); *B66C 19/007* (2013.01);
(Continued)

(58) Field of Classification Search
CPC ..... B66C 13/12; B66C 19/002; B66C 19/007; H02G 11/003; H02G 11/02; H01R 13/595
See application file for complete search history.

(56) References Cited

U.S. PATENT DOCUMENTS

2008/0048163 A1\* 2/2008 Maino ..................... B66C 13/12
254/391
2013/0056588 A1 3/2013 Harr
2016/0009530 A1 1/2016 Teruzzi

FOREIGN PATENT DOCUMENTS

CN 101450485 A 6/2009
CN 101549824 A 10/2009
(Continued)

OTHER PUBLICATIONS

First Office Action dated Jan. 6, 2020, for Chinese Application No. 201880003620.7 (with partial English translation), 10 pages.
(Continued)

*Primary Examiner* — Zachary L Kuhfuss
(74) *Attorney, Agent, or Firm* — Paul D. Bianco; Katharine Davis Wong; Fleit Intellectual Property Law

(57) ABSTRACT

A cable guide apparatus has an oscillating link rotatable about an axis and a cable guide for the line cable. The line cable is fed from and into a reservoir based on the distance between the reservoir and the feed device and is guided by the cable guide. A simplified automatic connection of a line cable to a feed device is achieved and provides protective guidance and storage of the line cable by a cable guide apparatus in which the oscillating link can be moved linearly relative to the oscillation axis. A power supply system includes this cable guide apparatus. The related method
(Continued)

comprises: a) retracting a connecting element, which is arranged on the line cable, into the cable guide apparatus and before, at the same time or afterwards b) moving the oscillating link from an extended to a retracted position relative to the oscillation axis in a linear manner.

20 Claims, 20 Drawing Sheets

(51) Int. Cl.
*H01R 13/595* (2006.01)
*H02G 11/00* (2006.01)
*H02G 11/02* (2006.01)

(52) U.S. Cl.
CPC ......... *H01R 13/595* (2013.01); *H02G 11/003* (2013.01); *H02G 11/02* (2013.01)

(56) References Cited

FOREIGN PATENT DOCUMENTS

| | | | |
|---|---|---|---|
| CN | 102751690 A | 10/2012 | |
| CN | 103052589 A | 4/2013 | |
| CN | 105073623 A | 11/2015 | |
| CN | 205509450 U | * 8/2016 | |
| DE | 20 2006 009750 U1 | 10/2007 | |
| EP | 0017178 A1 | 10/1980 | |
| WO | WO-2009053338 A1 | * 4/2009 | ........... B65H 75/425 |
| WO | 2014/081378 A1 | 5/2014 | |
| WO | 2014/131826 A1 | 9/2014 | |

OTHER PUBLICATIONS

International Preliminary Report on Patentability, dated Nov. 12, 2019, with Written Opinion (English translation) for PCT/EP2018/061357, filed May 3, 2018.
International Search Report dated Jul. 26, 2018 for PCT/EP2018/061357 filed May 3, 2018.
Written Opinion for PCT/EP2018/061357 filed May 3, 2018.
Result of examination report for German Application No. 10 2017 109 990.5 dated May 9, 2017.

* cited by examiner

CABLE GUIDE APPARATUS, POWER SUPPLY SYSTEM AND METHOD FOR CONNECTING A LINE CABLE TO THE CONNECTING APPARATUS

FIELD OF THE INVENTION

The present invention relates to a cable guide apparatus, a power supply system, and a method for connecting a line cable to the connecting apparatus.

BACKGROUND OF THE INVENTION

DE 20 2006 009 750 U1 discloses a container loading crane comprising a line cable drum for winding and unwinding a line cable. The line cable is connected to a stationary feed device, in relation to which the loading crane moves in a longitudinal direction. Depending on the position of movement, the line cable is wound onto or off the line cable drum. The disadvantage is that the conductor crane is fixedly confined to a path, along which the crane moves back and forth in the longitudinal direction. For this reason, for a long time the cranes were mounted on rails and rigidly connected to a feed device.

Since cranes are increasingly intended to move not only along a single container stacking area, but also between different laterally and longitudinally staggered stacking areas, they can no longer be rigidly connected to a single feed device that is dedicated to the particular container stacking area. Instead, it must be possible to connect them flexibly to different feed devices.

To make this possible, WO 2014/131826 A1 proposes an apparatus for automatically connecting a crane to an electrical power supply source, with the ends of the connecting line, which is carried along on the crane, being fitted with a plug which is plugged into a docking station which is buried in a hole in the ground. The docking station comprises two vertical rods which are spaced at a distance from one another and which are inserted into the guide openings of the plug as the plug is being inserted into the docking station. In addition, to secure the plug to the docking station, an automatic locking mechanism is disposed in the hole in the ground.

The line cable extends from the docking station vertically in the upward direction and, as the crane moves away from the docking station, comes to rest on the ground in the longitudinal direction next to the crane. The line cable should be bent as smoothly as possible and the bending radius of the line cable should not fall below a specific minimum. In addition, to avoid damage to the electrical lines inside the line cable when the cable is pulled or wound up, a strain relief means is provided. To this end, the prior art apparatus comprises an additional line cable support system, around which support system the line cable extending from the plug in the ground is deposited. The line cable support system, together with the plug, is placed onto the docking station. This has the disadvantage that either an operator must wrap the line cable around the line cable support system or the line cable must already have been wound around the support system prior thereto. Furthermore, the line cable support system is technically complex as well as large and heavy, which requires that the apparatus for placing and receiving the plug and the line cable support system must be constructed to be sufficiently robust and strong. In addition, the overall apparatus that has to be carried along on the crane is heavy and thus increases the weight of the crane, which requires a more powerful drive system for the crane. Furthermore, this unit has large dimensions which require a large installation space on the crane and increase the width of the crane.

CN 102751690 A relates to the field of port machinery and discloses a guide apparatus and a power supply unit. The guide apparatus comprises a guide rail system, a sliding system and a control system, with the guide rail system having a guide rail, with the sliding system being movably disposed on the guide rail and, on the inside, having a cable guide gear rack for guiding a cable, and with the control system being used to control the cable and to stop the cable from being retracted or paid out. If the tension applied to the cable exceeds the preset tension while the cable is being retracted or paid out, the sliding system is actuated to cause it to slide on the guide rail system through the cable. If the sliding distance of the sliding system on the guide rail system is greater than a preset distance, the control system stops the cable from being retracted or paid out. The cable can actuate the sliding system to cause the system to slide on the guide rail system in order to exert a buffering effect on the cable if the tension applied by a cable drum to the cable is excessive and exceeds the preset tension, thereby ensuring that the cable is not damaged or torn during the process of slowing down or stopping an apparatus that is used to retract or pay out the cable.

SUMMARY OF THE INVENTION

Thus, one aspect of the present invention relates to eliminating the disadvantages referred to above and to make it easier to automatically connect a line cable to a feed device disposed on the ground and to make it possible to guide and store the line cable in a protective manner and, more specifically, to reduce the risk of the line cable breaking or becoming excessively bent when the electrical load is moved.

A cable guide apparatus, a power supply system, and a method for connecting a line cable to the connecting apparatus are disclosed. Advantageous refinements and developments of the invention are also disclosed.

According to the present invention, an above-mentioned cable guide apparatus for a line cable is characterized in that the oscillating link can be moved in relation to the oscillation axis in a linear manner. The oscillation axis can preferably extend essentially at right angles to the travel direction.

The cable guide apparatus can preferably comprise at least one roller bow with sliding and/or rolling elements disposed thereon for guiding a line cable in the travel direction, with a preferred implementation providing that a second roller bow with sliding and/or rolling elements disposed thereon be arranged opposite to the first roller bow in the travel direction. The sliding and/or rolling elements can preferably have different widths, with the width increasing especially in the payout direction of the line cable.

In a useful modification, the cable guide apparatus can have a second cable guide for the line cable, which, in the payout direction of the line cable, can be disposed upstream of the cable guide of the oscillating link.

Preferably disposed on the oscillating link can be a drive for the linear movement of the oscillating link in relation to the oscillation axis, especially for the movement of a linearly moving part of the oscillating link in relation to the oscillator bracket, which is mounted on the cable guide apparatus, especially on a frame of the cable guide apparatus, so as to be able to pivot about the oscillation axis. The drive can preferably comprise a linear drive, especially an electrical linear motor and/or a belt drive. The drive can also comprise a gear rack, which is disposed on the part of the oscillating link that moves in the linear direction, and a rotary motor with a drive pinion which meshes with the gear rack.

Preferably disposed on the cable guide apparatus can be at least one holding element for holding a connecting element which is disposed on the end of the line cable. The holding element can preferably comprise a first lever arm which, in the retracted position of the connecting element on the cable guide apparatus, rests against the connecting element. The holding element can also comprise a stop, which, upon retraction of the connecting element into the cable guide apparatus, rests against the connecting element and/or the cable guide of the oscillating link and moves the first lever arm to make it rest against the connecting element. The holding element can preferably be held in an open position intended for the reception of the connecting element on the cable guide apparatus.

According to the present invention, an above-mentioned power supply system is characterized in that a cable guide apparatus according to the present invention as described above and below is disposed on the movable electrical load. The reservoir can preferably be a motor-driven cable drum. In addition, a layout direction of the line cable can preferably extend from the feed device to an exit of the line cable from a cable guide apparatus disposed on the electrical load, with the difference between the travel direction and the laydown direction preferably being very small, especially no more than 15°.

According to the present invention, an above-mentioned method for connecting a line cable disposed on an electrical load to a feed device is characterized by the following steps: a) retracting a connecting element, which is disposed on the line cable, into the cable guide apparatus and, prior thereto, at the same time or afterwards, b) moving the oscillating link in relation to the oscillation axis from an extended position to a retracted position in a linear manner. Additional steps can preferably comprise: c) positioning the connecting element in relation to the feed device, d) gripping the connecting element and/or the line cable by means of a manipulator of a connecting apparatus according to step b), e) connecting the connecting element to a connector of the feed device by means of the manipulator.

BRIEF DESCRIPTION OF THE DRAWINGS

The invention will be described below based on detailed embodiment examples with reference to the accompanying drawings. These drawings show:

FIG. 26 a lateral view of the cable guide apparatus of FIG. 25 viewed from left in

FIG. 25;

DETAILED DESCRIPTION OF THE INVENTION

Figure 1:
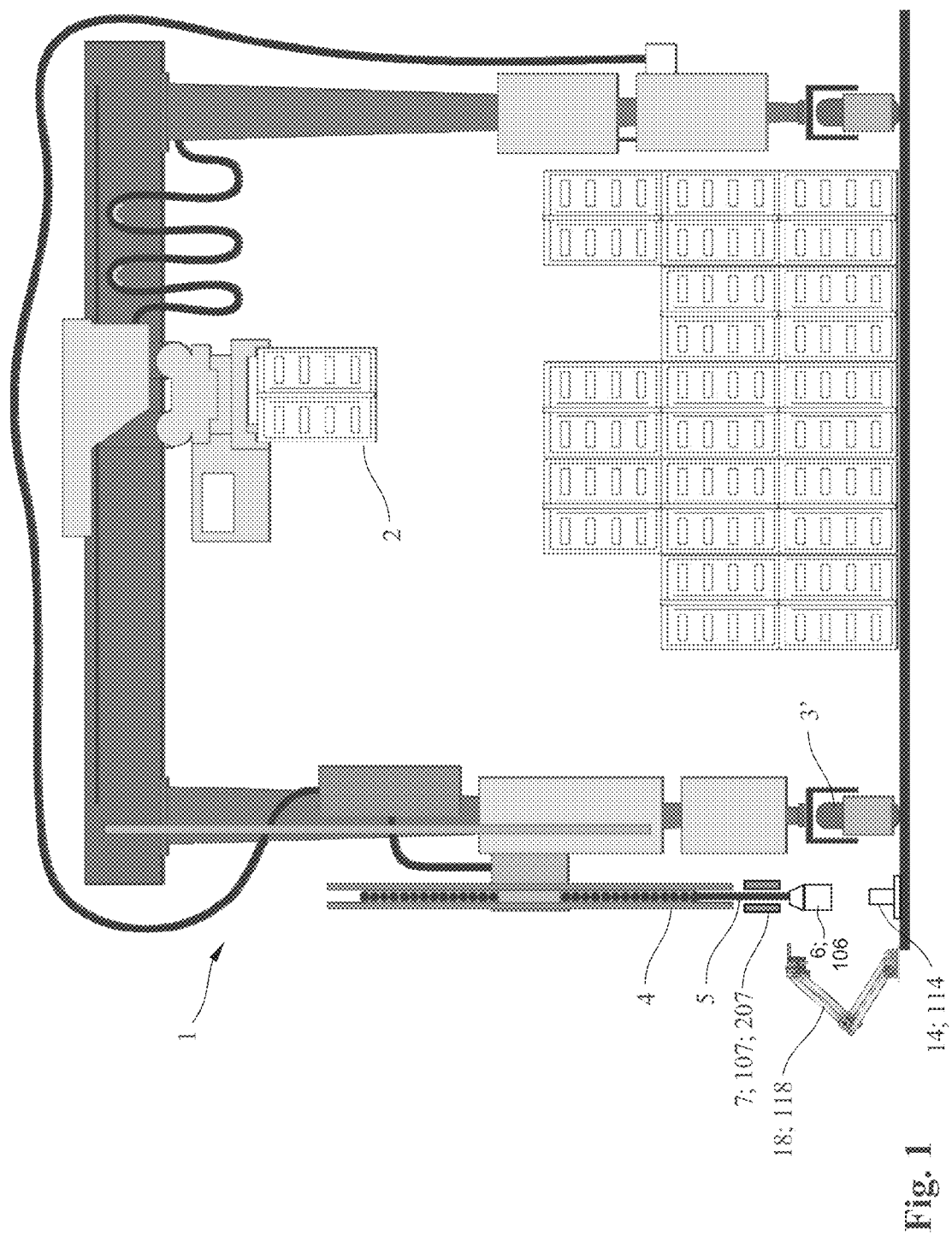
FIG. 1 a schematic lateral view of a power supply system for a container crane.

FIG. 1 shows a crane 1 known in the art for the transfer of containers 2 stored in a container stacking area, such as is used in large transfer facilities, especially in ports. The crane 1 is able to move on wheels 3, 3' in a travel direction F along a travel path next to the container stacking area, with the travel path generally running parallel to the stored containers 2. As a rule, in transfer facilities, a plurality of such container stacking areas is arranged side by side and sometimes one behind the other, and the crane 1 as well as other cranes can be moved between the individual container stacking areas.

To supply electrical power to the crane 1 and to the electrical equipment installed thereon, e.g., the motors for lifting and moving the containers 2 and the electrical drive systems of the wheels 3, 3', and/or optionally to transmit data from and to the crane 1, a line cable drum 4 is disposed on the outside of the crane 1, around and from which drum an electrical line cable 5 can be wound and unwound in a laydown direction according to the travel path of the crane 1 in the travel direction F. As a rule, the laydown direction and the travel direction F are the same or differ only slightly from one another since the line cable 5 is preferably laid down parallel to the travel direction F. The line cable 5 is laid down along the travel path of the crane 1, which travel path along its length generally also differs slightly from the ideal line that runs parallel to the containers 2. Thus, "parallel" here and hereinafter does not mean that the paths are mathematically exactly parallel at each point of the traveling path, but that the line cable 5 is laid down next to the container stacking area within the limits of travel and laydown inaccuracies. This is known from the prior art.

Disposed on the freely downwardly suspended end of the line cable 5 is a connecting element in the form of a connector plug 6 and 106 which can be guided accurately and as free from tension as possible by means of a cable guide apparatus 7 and 107 disposed on the crane 1 for the purpose of laying the cable down on the ground and for rewinding it onto the cable drum 4.

Figure 2:
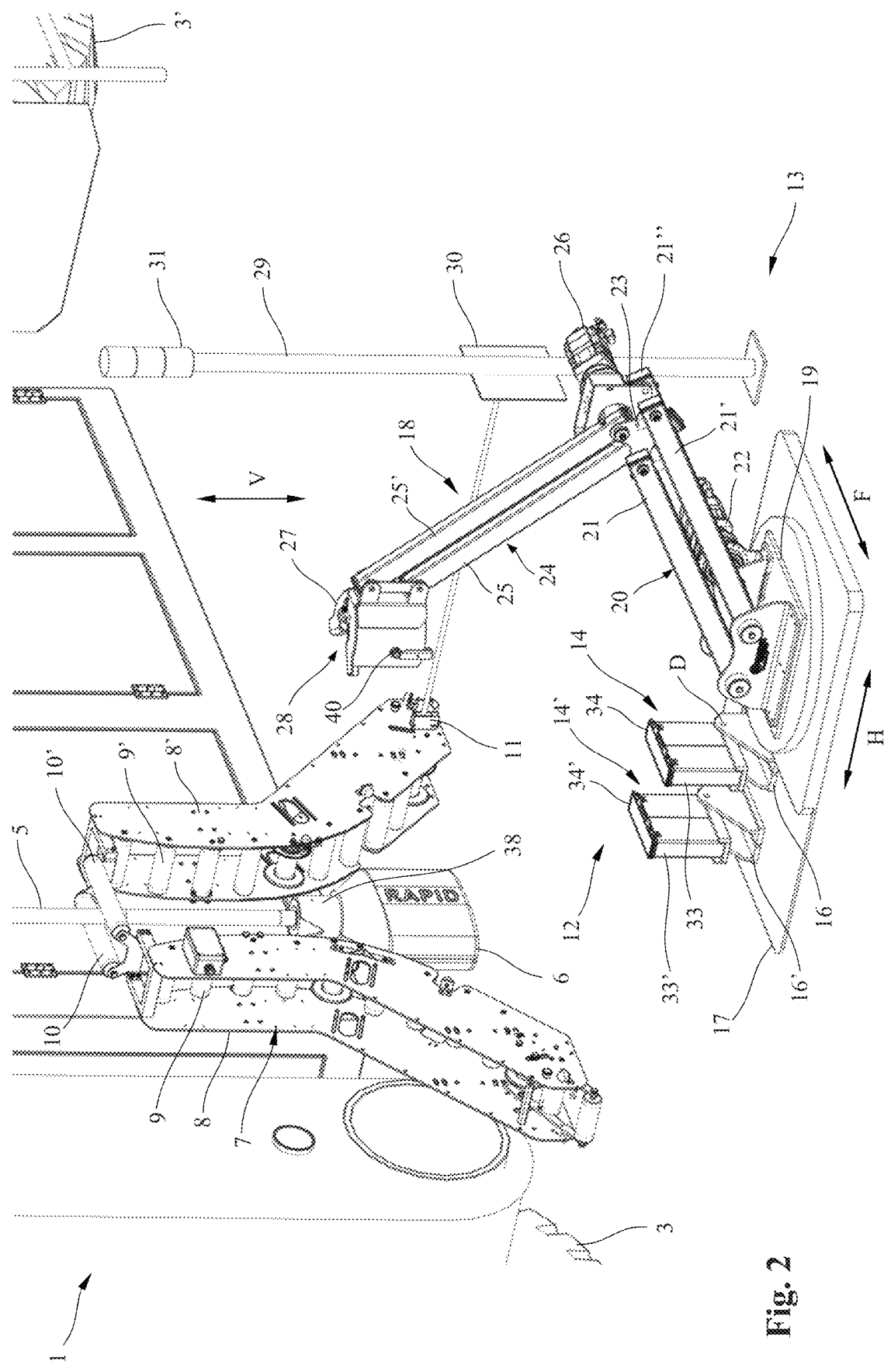
FIG. 2 a schematic three-dimensional view of a portion of FIG. 1 with a first connecting apparatus according the present invention.

In the detailed diagrammatic three-dimensional view of a first embodiment example in FIG. 2, a portion of the crane 1 and the wheels 3, 3' is once again shown from an oblique lateral perspective. It also depicts details of the cable guide apparatus 7, by means of which the line cable 5 can be laid down on the ground neatly and with application of the lowest possible force and tension. The cable guide apparatus 7 comprises two oppositely lying roller bows 8, 8', which, in the travel direction F of the crane 1, are offset relative to one another and which widen toward the bottom. In the roller bows 8, 8', a plurality of freely pivotable longitudinal guide rollers 9, 9' are disposed, along which the line cable 5 can be guided with the lowest possible friction. In the lateral direction H at right angles to the travel direction F, the line cable 5 is guided by means of two lateral guide rollers 10, 10', which are disposed above the roller bows 8, 8' and which, in the current embodiment example, connect these roller bows, which is, however, not necessary. On the lower end of the roller bow 8' on the right side in FIG. 2, a sensor unit 11 is disposed, the function of which will be explained below. It is, however, also possible to dispose the sensor unit 11 somewhere along the cable guide apparatus 7 or on the crane 1 and to link it to the control unit without a cable.

To connect the connector plug 6 to an electrical power supply, not shown in detail in the drawing, a feed device 12 with a connecting apparatus 13 disposed thereon is stationarily arranged next to the travel path of the container crane 1. In the case at hand, the feed device 12 comprises two connectors in the form of plug-in connectors 14, 14' which, by means of two connector members in the form of swivel plates 15, 15', are articulated in bearings 16, 16' so as to pivot about axes of rotation D, D' (see FIG. 7). The bearings 16, 16' are attached to the ground or, more specifically, to a mounting element, especially a mounting plate 17, on the ground, which mounting plate in turn is generally attached to a fixed foundation. The function of the pivotable bearing will be explained in greater detail below with reference to FIG. 7. It is, however, also possible to dispose more or fewer plug-in connectors on a feed device.

The connecting apparatus 13 comprises a manipulator 18 which is designed to grip and actively move the connector plug 6 and to establish a connection between the connector plug 6 and the plug-in connector 14. The manipulator 18 comprises a manipulator base 19, to which a lower manipulator arm 20 with lower sub-arms 21, 21', 21" are articulated, two of which are fully visible in FIGS. 2 to 6 and the third partially obscured. The manipulator arm 20 can be moved by means of a lower manipulator drive 22 which rotates sub-arm 21" and preferably also sub-arm 21'.

On their upper ends, the lower sub-arms 21, 21', 21" are connected to a cross-shaped connecting piece 23 in such a way that the sub-arms 21, 21' 21" form a first guide in the shape of a parallelogram. Also connected to this connecting piece is an upper manipulator arm 24 which, together with two upper manipulator arms 25, 25', is pivotably articulated to two other hinge connectors of the connecting piece 23, which hinge connector are offset in a crosswise manner relative to the hinge connectors of the lower sub-arms 21, 21', 21'''. On their upper front ends, the manipulator arms 25, 25' are again connected to one another in the shape of a parallelogram. The upper sub-arm 25' can be rotated about its lower hinge axes via an upper manipulator drive 26.

Figure 4:
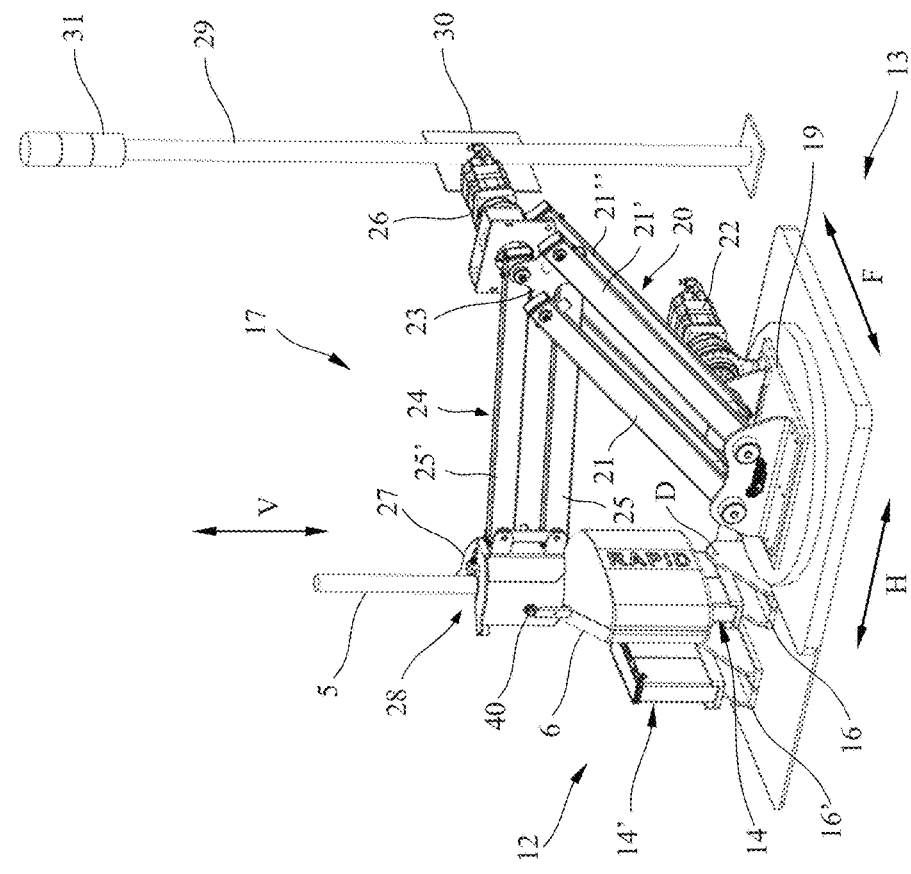
FIG. 4 the manipulator arm of FIG. 3 during connection of the connector plug to a plug-in connector of a feed device.

Disposed on the upper front end of the upper manipulator arm 24 is a gripping device 27 for the connector plug 6, which allows the connector plug 6 to be accurately positioned in relation to the plug-in connector 14 by means of the manipulator 18, which moves only in the horizontal feed direction H and the vertical feed direction V. The gripping device 27 has a funnel-shaped feed opening 28 to allow the connector plug 6 to be securely gripped and moved as shown in FIG. 4. A more detailed description will be provided below.

In order to be able to position the connector plug 6 relative to the manipulator 18, which moves only in the horizontal feed direction H at right angles to the travel direction F of the crane 1, in such a manner that the gripping device 27 can securely grip the connector plug 6, a signal mast 29 is mounted next to the connecting apparatus 13. A positioning element in the form of an identification plate 30 is disposed on the signal mast 29. The sensor unit 11, which in FIG. 2 is disposed on the lower right end of the roller bow 8, detects whether the identification plate 30, relative to the sensor unit 11, is in a position in which the manipulator 18 is able to grip the connector plug 6. If so, the gripping procedure is triggered by the manipulator 18, which is able to somewhat compensate for distance differences in the horizontal feed direction H.

For example, it is possible to check whether or not the identification plate 30 is located within the measuring range of the sensor unit 11. Thus, the identification plate 30 can have a large-surface QR Code and the sensor unit 11 can have a very narrow measuring range, within which the QR Code must be located. Alternatively or additionally, the identification plate 30 can also have a reflector foil of known dimensions and position, in which case the distance thereto is then preferably measured by means of the sensor unit 11. As soon as the beginning of the reflector foil is detected, the position of the crane 1 and the cable guide apparatus 7 in relation to the manipulator 18 can be determined based on the known dimensions. The distance measurement can also be used to ensure that the manipulator 18 grips the connector plug 6 quickly and at the most accurate distance possible.

Since the feed opening 28 has the shape of a funnel, a certain offset of the connector plug 6 in relation to the feed opening 28 in the travel direction F can be compensated for even if the crane 1 is not completely accurately positioned.

To signal the accurate position and optionally the securely established connection between the connector plug 6 and the plug-in connector 14 to the driver or operating personnel of the crane 1, an easily visible signal light 31 with the conventional traffic light signal colors, red, yellow and green, is mounted on the upper end of the signal mast 29. Red signals that no connection has yet been established, yellow indicates that the connection is being established, and green signals the established connection and the withdrawal of the manipulators 18, i.e., clearance for further movements. It is, however, also possible to use different colors or light signals, such as slow and rapid blinking or the like. Alternatively, the signal light 31 can also be used to inform the driver whether a plug-in connector 14, 14' on the feed device 12 is still open: Thus, red would indicate 'none open' and green would indicate 'open plug-in connector,' while yellow would signal that a connection to the feed device is currently being established.

The process of gripping and connecting the connector plug 6 to the plug-in connector 14 will be described below by way of example with reference to FIGS. 3 to 6.

Figure 3:
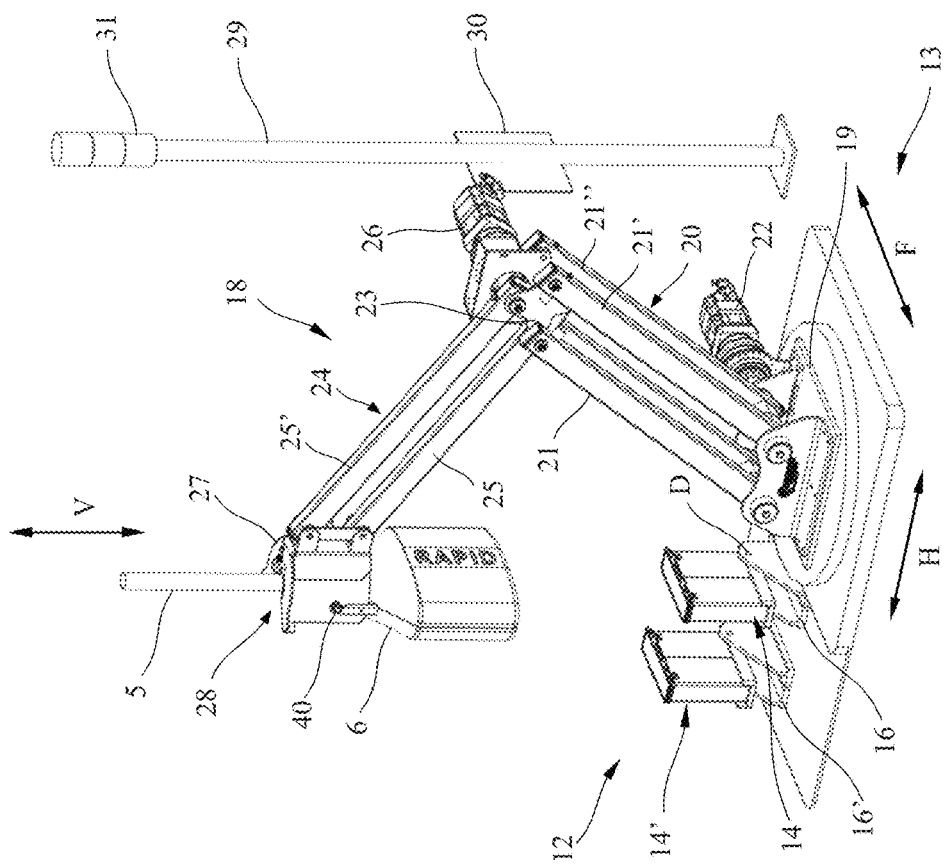
FIG. 3 a schematic three-dimensional view of a manipulator arm of the connecting apparatus of FIG. 2 during gripping of a connector plug.

In FIG. 3, the crane 1 has already been moved into the favorable position with respect to the connecting apparatus 13, and the manipulator arm 18 has already gripped the connector plug 6 by means of the gripping device 27. Prior thereto, the manipulator 18 travels with the gripping device 27 toward the line cable 5 above the connector plug 6 and grips it. The gripping device 27 subsequently travels from the top downwardly via an upper cylindrical gripping member 38 of the connector plug 6 up to a stop (not shown) until a grip stop locks the connector plug 6 to the gripping device 27.

The gripping member 38 has a centering funnel 39, readily visible in FIG. 2, into which oppositely lying centering pins 40 disposed in the funnel-shaped feed opening 28 engage. In FIG. 2, a centering pin 40, in its suggested position, is shown to be disposed on the outside of the gripping device 27. The advantage of this configuration is that the connector plug 6 held by the gripping device 27 is oriented in such a manner that it can be cleanly plugged into one of the plug-in connectors 14, 14'.

By rotating the upper manipulator arm drive 26 and optionally the lower manipulator arm drive 22, the manipulator 18 subsequently moves the connector plug 6 over the plug-in connector 14, as shown in FIG. 4, so that a connector plug opening 32 (only visible in FIG. 6) of the connector plug 6 is aligned with the outside contour of the plug-in connector 14. As FIG. 4 indicates, the connector plug 6 is subsequently pushed onto the plug-in connector 12 by means of the manipulator 18 and is detachably connected to a plug locking mechanism, which is not shown in detail but will be described in detail below. At the same time, the plug-in connector 14 also establishes an electrical connection between an electrical power supply of the container stacking area, which is electrically connected to the plug-in connector 14 and the connector plug 6 of the crane 1, and thus to the electrical supply network of said crane. Similarly, a data link, e.g., an electrical or optical data transmission link, can be established, e.g., by making available detachable plug-in connectors.

The guide system of the manipulator 18 in the form of two parallelograms offers the advantage that it ensures that the gripping device 27 during its movement does not change its angle of inclination in relation to the plug-in connector 14. Thus, the connector plug 6 moved by the gripping device 27 is not tilted out of the ideal position shown in the drawings, thereby ensuring that the line cable 5 is not excessively bent or even broken off. To ensure this result, the design of the manipulator 18 can, however, differ from that used for the guide system in the form of a parallelogram, for example, by using a robot with at least one robot arm and a gripping device disposed thereon, or by using another method known to those skilled in the art. For example, it is also possible to used two linear telescopic arms or extensions, such as one horizontal and one vertical extension.

Figure 5:
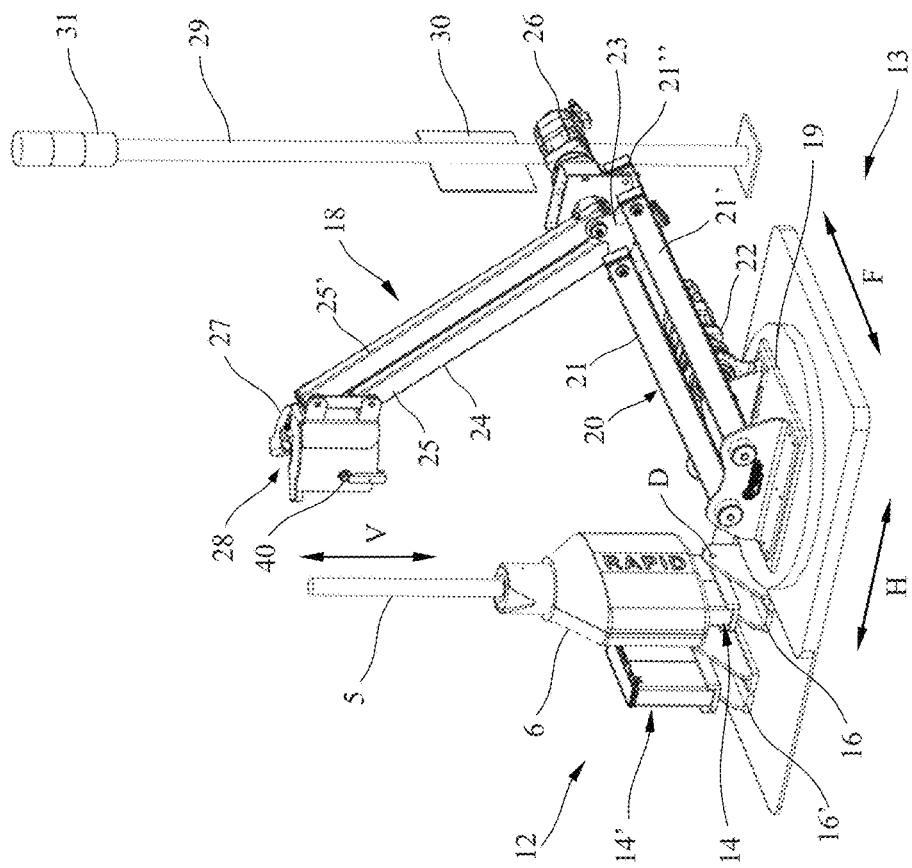
FIG. 5 the manipulator arm of FIG. 3 in a retracted position after release of the connector plug.

Subsequently, as shown in FIG. 5, the grip stop of the gripping device 27 is released and the manipulator 18 is moved by turning the manipulator arm drives 22, 26 away from the line cable 5 and the connector plug 6 to the right side of the crane 1 as seen in FIG. 5. Subsequently, the signal lamp 31 signals to the operating personnel of the crane 1 that the connection between the connector plug 6 and the plug-in connector 14 has been established and that the manipulator 18 is released, i.e., that the crane 1 can move away from the connecting apparatus 13 to resume its normal operation. In the current embodiment example, the connecting apparatus 13 is disposed at the entrance to a travel path for the crane 1 so that the travel direction along the container stacking area in FIGS. 2 to 6 is oriented obliquely upwardly toward the right. The connecting apparatus 13 can, however, also be disposed at a different spot.

As is known from the prior art, to ensure the longest possible service life of the line cable 5, it is important not to bend the cable beyond the admissible minimum bending radius or even that it be completely kinked, at least as rarely as possible, preferably never.

Thus, one aspect of the present invention relates to making available an improved guide system for the line cable 5 that is connected to a feed device and, more specifically, to reduce the risk of kinking or excessive bending of the line cable 5 during travel of the electrical load, particularly the crane 1.

Figure 6:
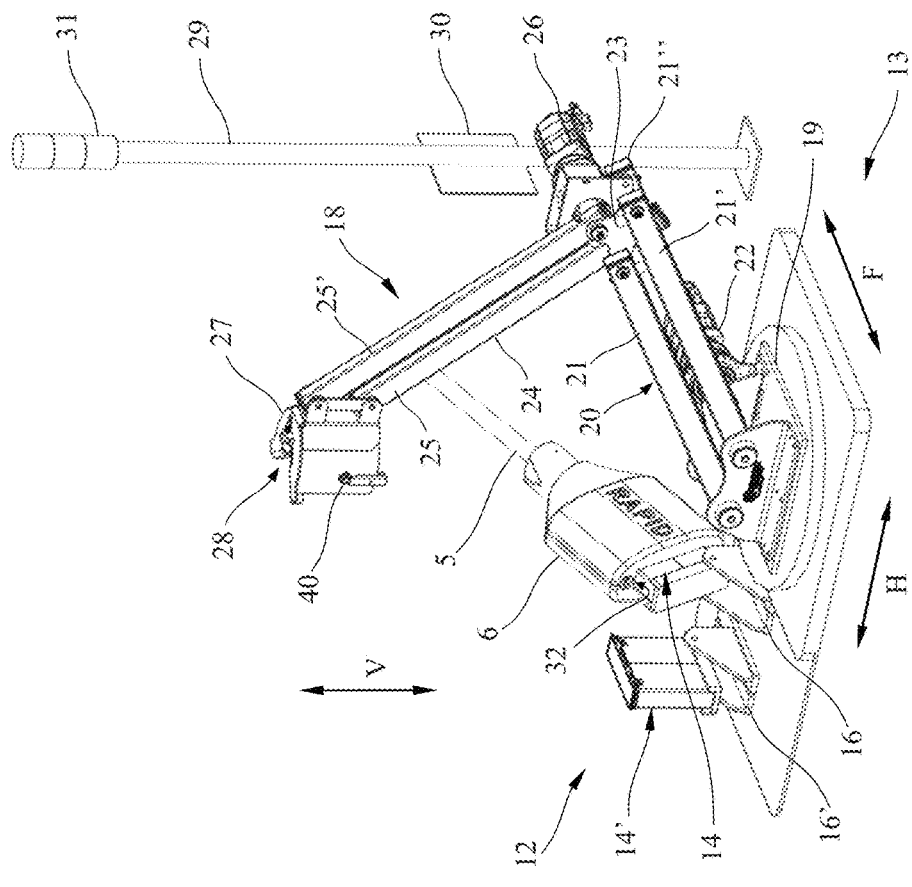
FIG. 6 the view of FIG. 5 with the plug-in connector swiveled out of the rest position by the movement of the crane.
Figure 7:
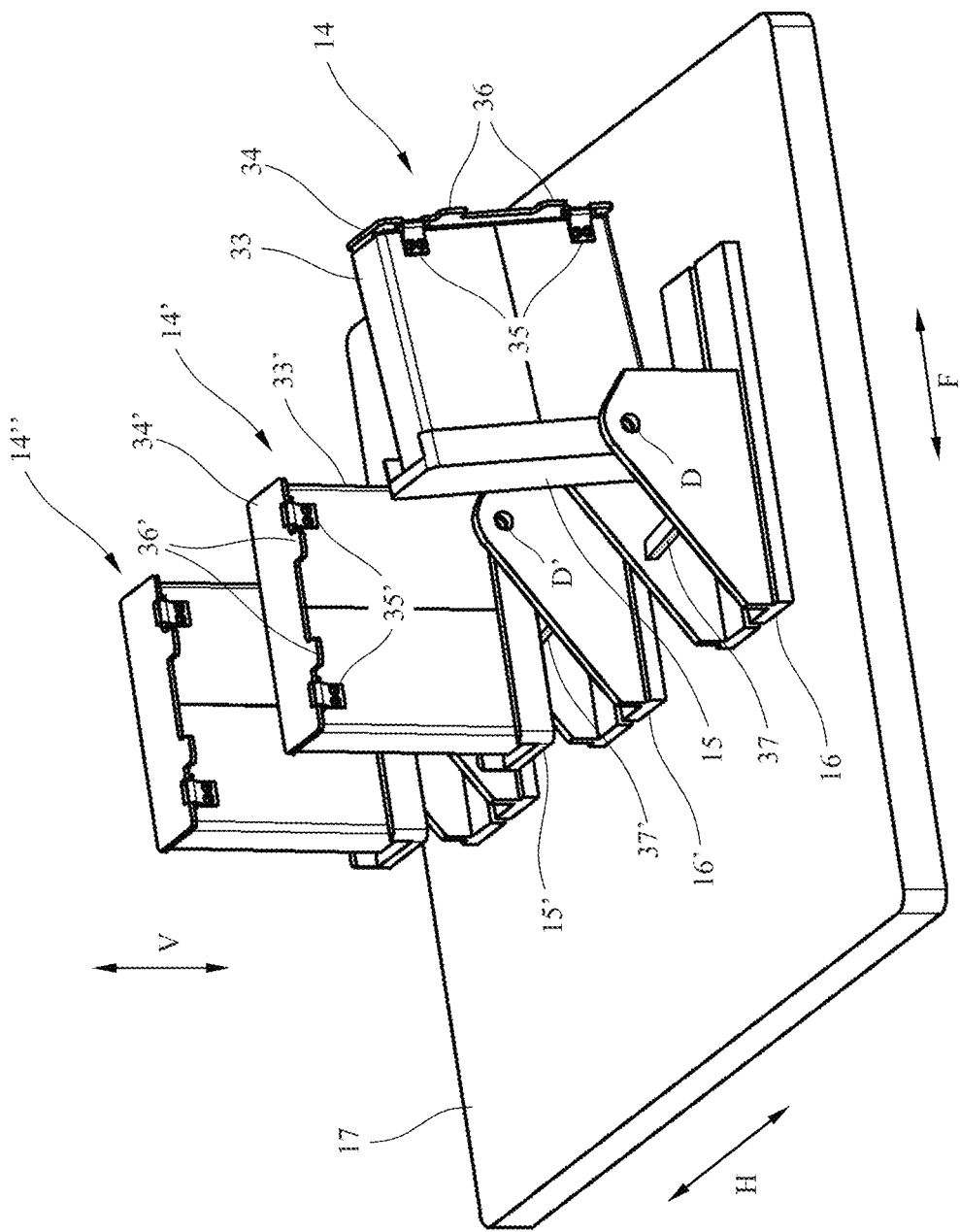
FIG. 7 a detail view of a portion of the feed device of FIGS. 2 to 6.

To this end, the invention proposes that the plug-in connectors 14, 14' be pivotably disposed about an axis of rotation D and D' extending at right angles to the travel direction F and preferably parallel to the ground, as especially clearly indicated in FIGS. 6 and 7. When the crane 1, along with the line cable 5, subsequently moves out of the connected position shown in FIG. 2 in the travel direction F toward the right, as indicated in FIG. 6, the line cable 5, because of the plug-in connector 14 which swivels in the travel direction F, will not be bent or will hardly be bent or kinked, but instead extend from the plug-in connector 14 predominantly in a straight and in the direction of pull of the line cable 5 to the cable guide apparatus 7. As the crane 1 subsequently moves farther away from the feed device 12 and the connecting apparatus 13, the line cable 5 is laid down, section by section, as is known in the art, next to the travel path of the crane 1. In contrast to the prior art, however, in the current development, the plug-in connector 14 is tilted just enough so that the connector plug 6 slants slightly downwardly and the line cable 5, coming from the connector plug 6 in a hardly bent or only slightly bent condition, is laid down on the ground.

Thus, throughout the entire laydown process, the line cable 5 undergoes only slight bending, which ensures protected line guidance, prolongs the service life of the line cable 5 and thus increases the reliability of the facility.

The use of the rotary function of the plug-in connector 14 illustrated in the drawings and described above is also possible in facilities in which the line cable 5 is permanently connected to the feed device 12, thereby leading to the advantages of an improved line cable guidance in these situations as well.

The detail view of the connecting apparatus 13 in FIG. 7 shows an additional plug-in connector 14", which, however, has the same function as the plug-in connectors 14, 14'. Since these have the same design, the invention will hereinafter preferably be explained with reference to this specific plug-in connector 14. The other two plug-in connectors 14', 14" and their parts will be identified by reference characters identical to those used for the plug-in connector 14, with the addition of one or two apostrophes if required.

The plug-in connector 14 comprises a plug-in connector housing 33 in which the electrical connector elements for an electrical power connection and/or a data link connection (not shown) are disposed.

To prevent moisture, dust, water, rain, etc., from penetrating the electrical connector elements from above, the upper end of the plug-in connector housing 33, which in FIG. 2 is shown in its rest position, has a cover 34 which is pivotably articulated to the plug-in connector housing 33 by means of two hinges 35. The cover 34 is held in the closed position by the action of a spring as known in the art and moved from an open position back into the closed position.

In order to be able to open the cover 34 automatically while the connector plug 6 is being positioned or plugged in, opening tabs 36 interactively connected to the cover 34 are disposed on the surface of the hinges 35 and project outwardly beyond the plug-in connector housing 33. A mating stop in the connector plug 6, especially the mating edge of the connector plug opening 32, pushes the opening tabs 36 downwardly while the connector plug 6 is being placed or pushed over the plug-in connector housing 33, which causes the cover 34 to move upwardly. This uncovers the electrical connector elements of the plug-in connector 14. Subsequently, the connector plug 6 is moved even further downwardly, and the electrical and/or data connector elements, in this case male, located in the connector plug 6 can be connected to the mating connector elements, in this case female, in the plug-in connector housing 33 and be protected against outside influences, such as wind, water, rain, etc. The cover 34 also prevents operating personnel or unauthorized persons from direct and unprotected access to the connector elements, especially the electrical connector elements.

To retain the swivel plate 15 and thus the plug-in connector 14 in the rest position shown in FIGS. 2 to 5, a stop 37 shown in FIG. 7 can be disposed on the bearing 16 for the swivel plate 15. In the implementation shown, the plug-in connector 14 subsequently remains in the rest position as a function of the weight. According to an advantageous implementation, not shown, it is also possible to have an elastic force act upon the swivel plate 15 in order to return the plug-in connector 14 to its rest position when it is not connected to the connector plug 6.

According to an alternative configuration of the connecting apparatus 13, which can preferably also be disposed along a travel path of the crane 1, the plug-in connectors 14, 14' are preferably designed to be able to pivot about an axis of rotation D, preferably disposed in the center, in both directions of the travel direction F, i.e., so that the line cable 5 can be laid down both on one side and on the other side of the plug-in connectors 14, 14'. Again, it is useful to provide a holding device which ensures that the unconnected plug-in connector extends in the direction suitable, and preferably upwardly pointing, for connecting the connector plug 6. The plug-in connector 14 can then be locked to the ground plate 17 until the connector plug 6 is securely connected to the plug-in connector 14. This type of development will be described below and can be independently implemented by those skilled in the art.

FIGS. 8 to 28 show alternative developments of parts of the power transmission system, the principle of which is shown in FIG. 1, especially with a modified feed device 112, connecting apparatus 113 and cable guide apparatus 107. Since these have largely an identical or similar function as those shown in FIGS. 2 to 7, these components are identified by identical reference characters, each with the addition of numeral "100." Any differences will be especially pointed out so that, unless otherwise specified, the explanations relating to specific components in the first implementation according to FIGS. 2 to 7 apply correspondingly to the alternative developments of FIGS. 8 to 28 and vice versa.

Figure 8:
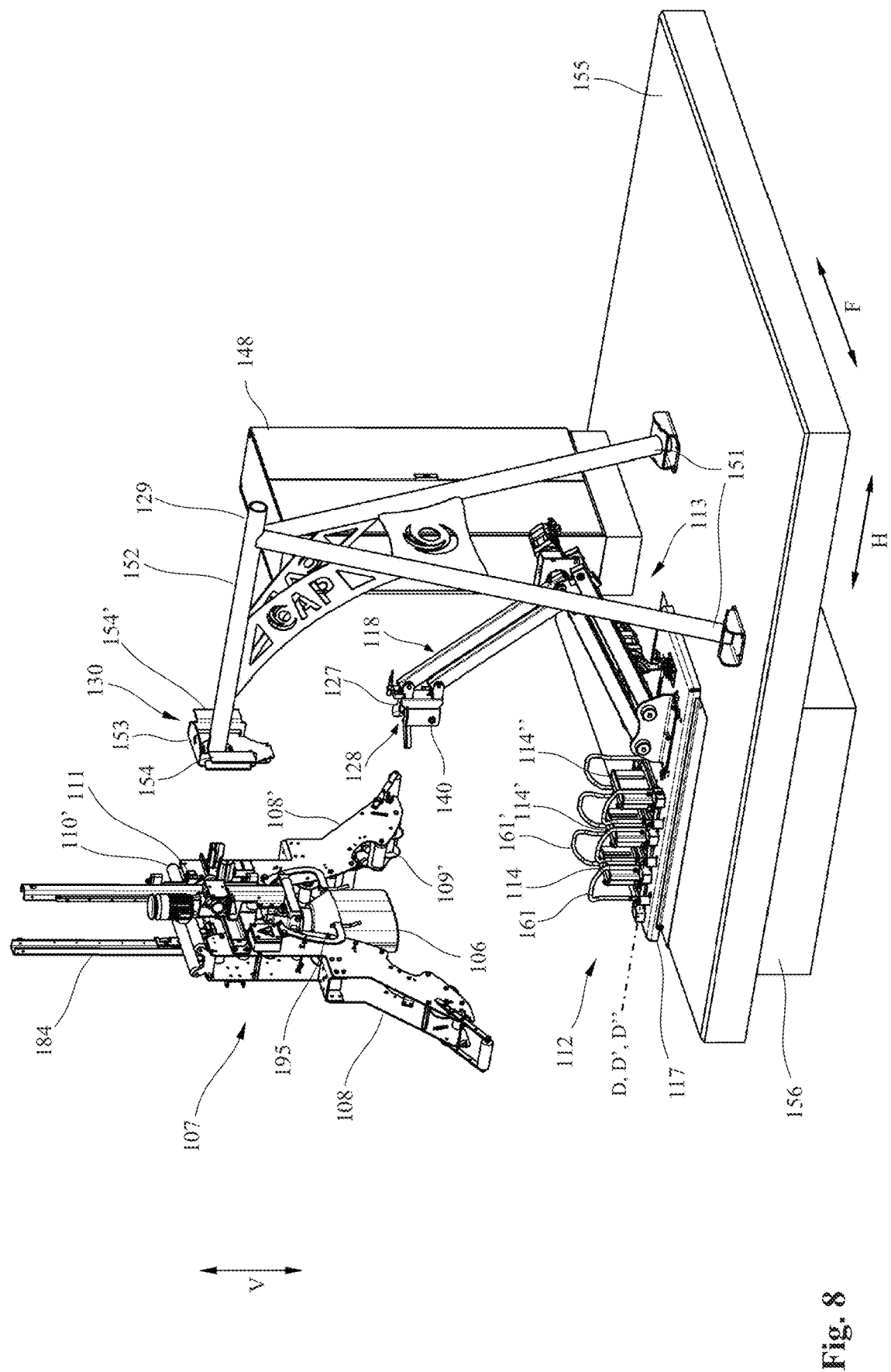
FIG. 8 a schematic three-dimensional view of a portion of FIG. 1 with an alternatively configured second connecting apparatus according to the present invention prior to gripping of a connector plug.
Figure 16:
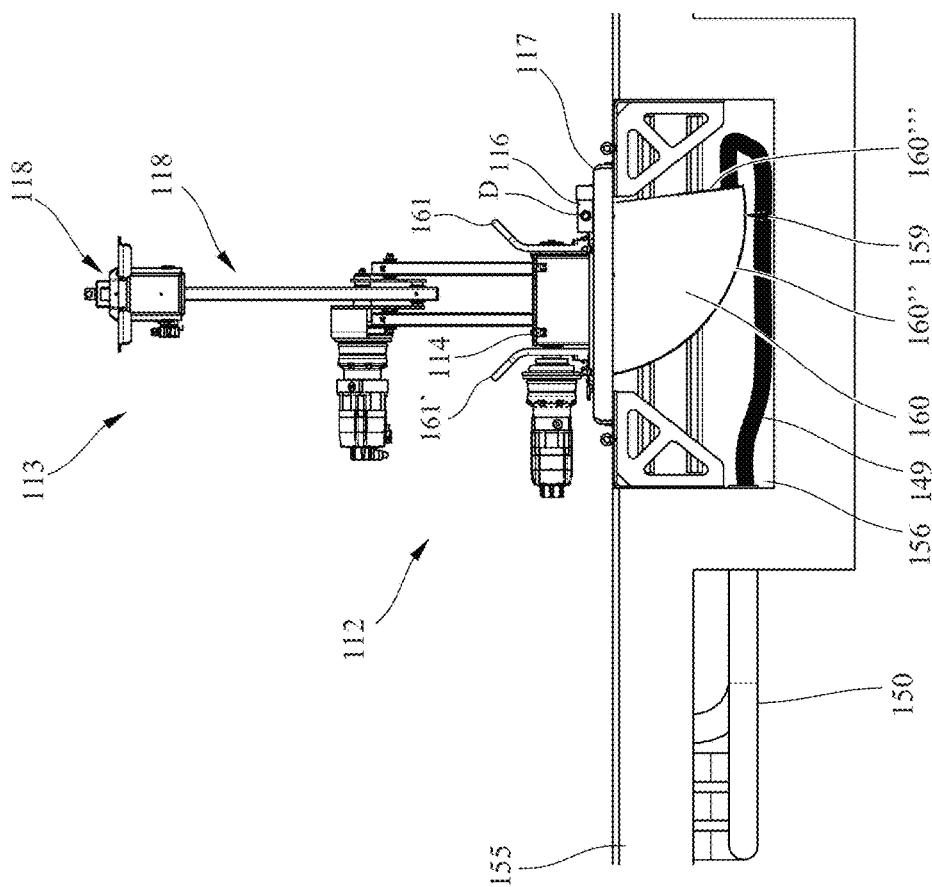
FIG. 16 a lateral view of the partially sectioned representation of the feed device and the connecting apparatus of FIG. 14 viewed from above on left of FIG. 14.

The feed device 112 shown in FIG. 8 includes a control cabinet 148 in which the electrical power supply unit is located and to which supply and data cables 149, indicated in FIG. 16 lead, which pass through cable conduits 150, 150', 150" (see FIGS. 16 to 18) into the control cabinet 148.

The working principle of the power transmission system in FIGS. 8 to 13 is basically the same as that shown in FIGS. 2 to 7. Thus, in FIG. 8, the line cable 5 with a connector plug 106 is again positioned relative to the manipulator 118 in such a manner that a gripping device 127 can grip the connector plug 106 during movement in the horizontal feed direction H. Subsequently, the connector plug 106 is slightly loosened so that the manipulator 118 can grip it with the gripping device 127 as described above and move it into the position required to place it onto the plug-in connector 114. The plug-in connector 114 has the same design as the plug-in connector 14 and particularly comprises a plug-in connector housing with a movable cover.

Figure 9:
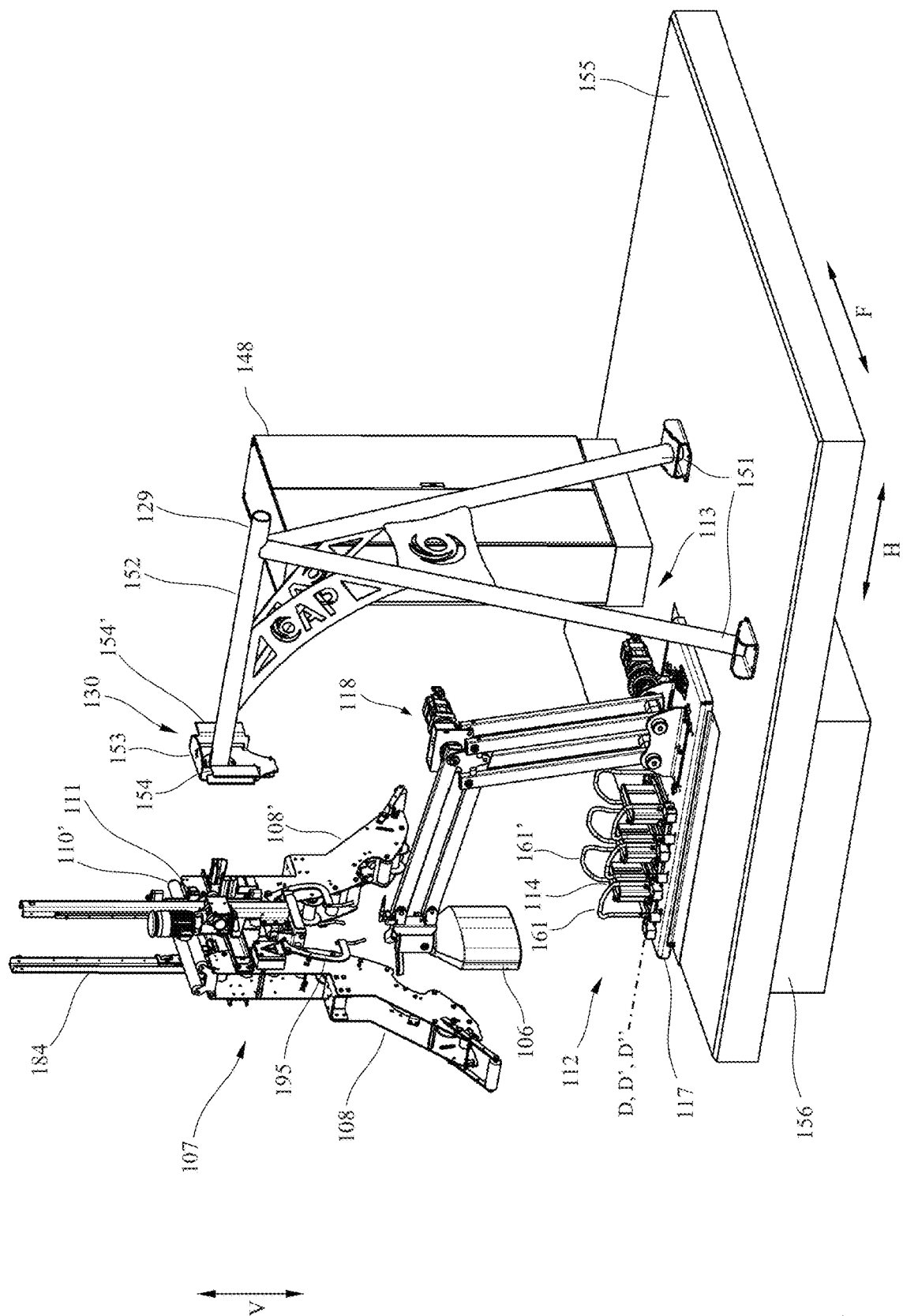
FIG. 9 a schematic three-dimensional view of a manipulator arm of the connecting apparatus of FIG. 8 during gripping of the connector plug.
Figure 10:
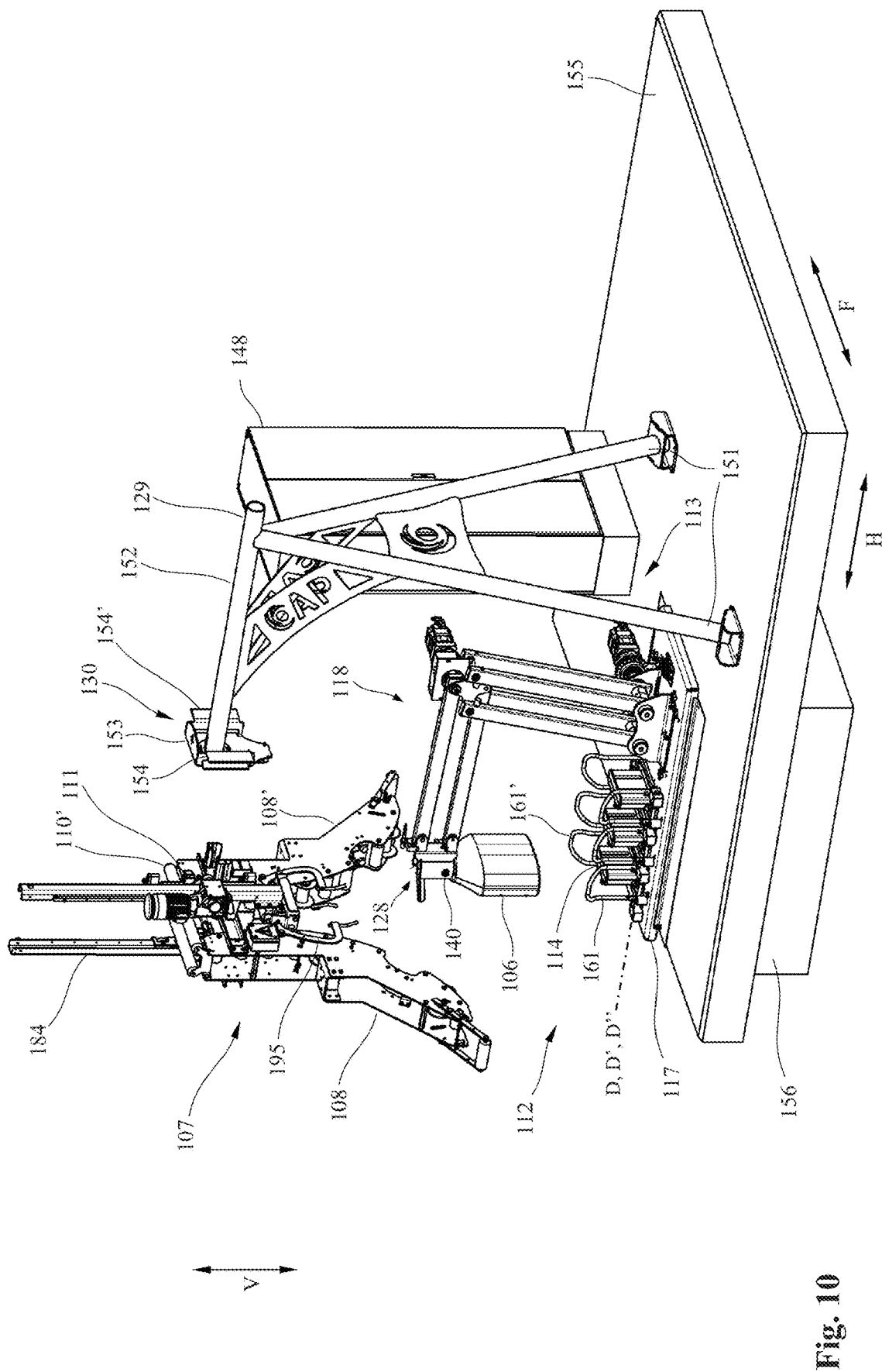
FIG. 10 the view of FIG. 9 with the manipulator arm of FIG. 9 during guiding of the connector plug to a plug-in connector of the feed device.
Figure 11:
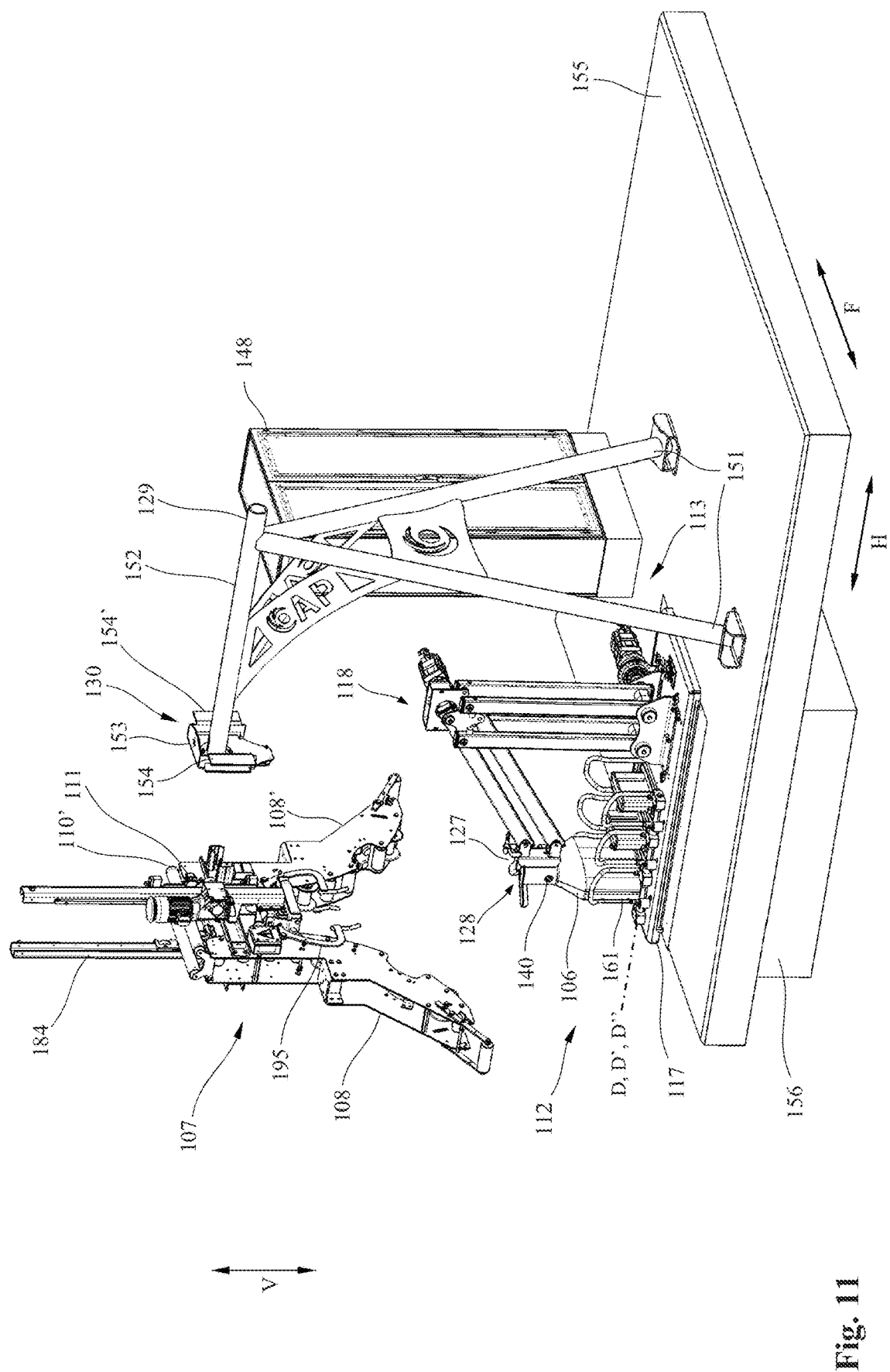
FIG. 11 the view of FIG. 9 with the manipulator arm of FIG. 9 during connection of the connector plug to the plug-in connector.

Subsequently, the connector plug 106 is again moved from the position in FIG. 9 to a plug-in connector 114 on which it is placed, as described above and as illustrated in FIGS. 10 to 11. The connector plug 106 is again locked to the feed device 112, which will be explained in greater detail below with reference to FIGS. 19 and 20. Subsequently, as shown in FIG. 12, the manipulator 118 can be disengaged from the connector plug 106 and moved into its rest position.

Figure 12:
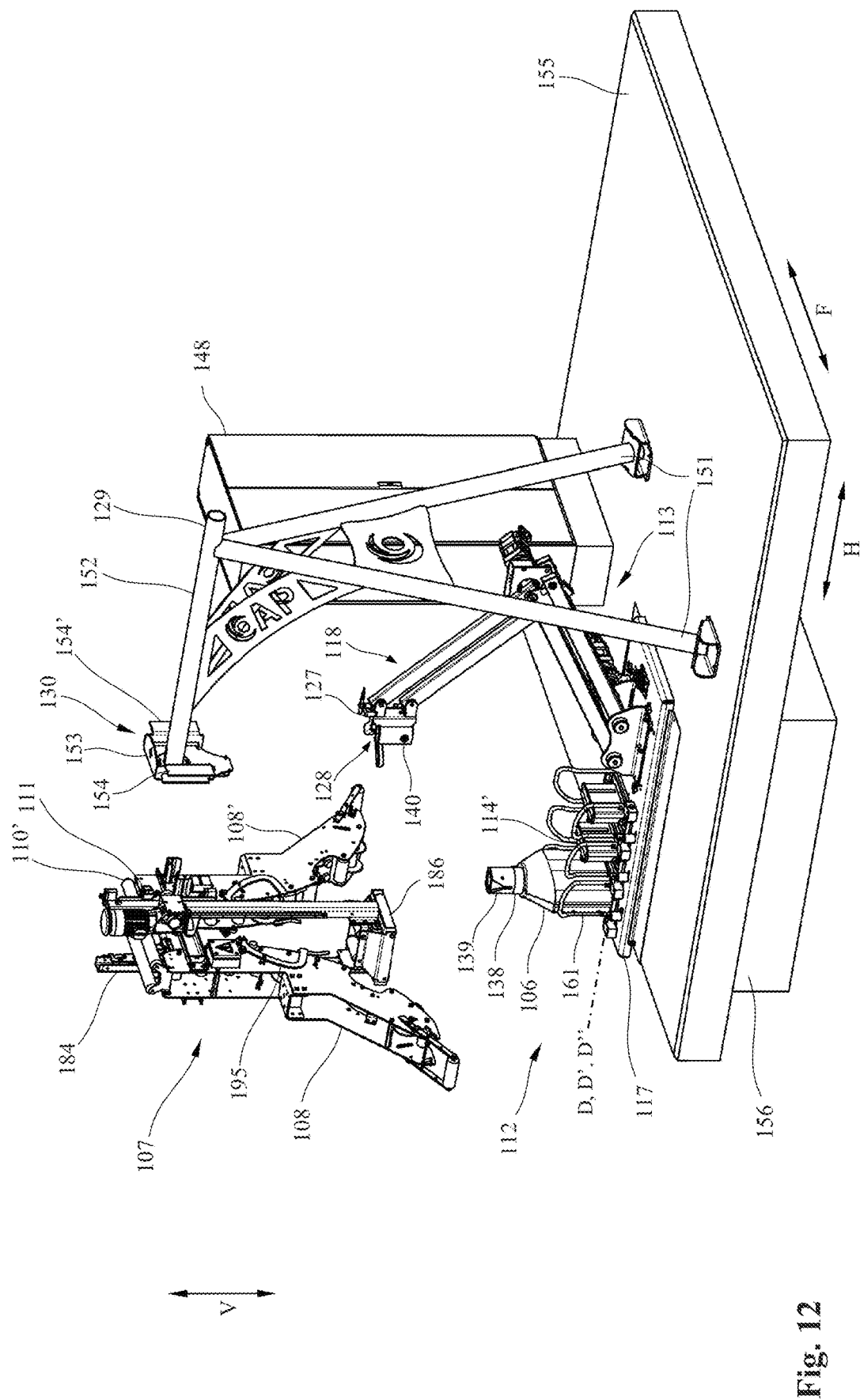
FIG. 12 the view of FIG. 9 with the manipulator arm of FIG. 9 in a retracted position after release of the connector plug.
Figure 13:
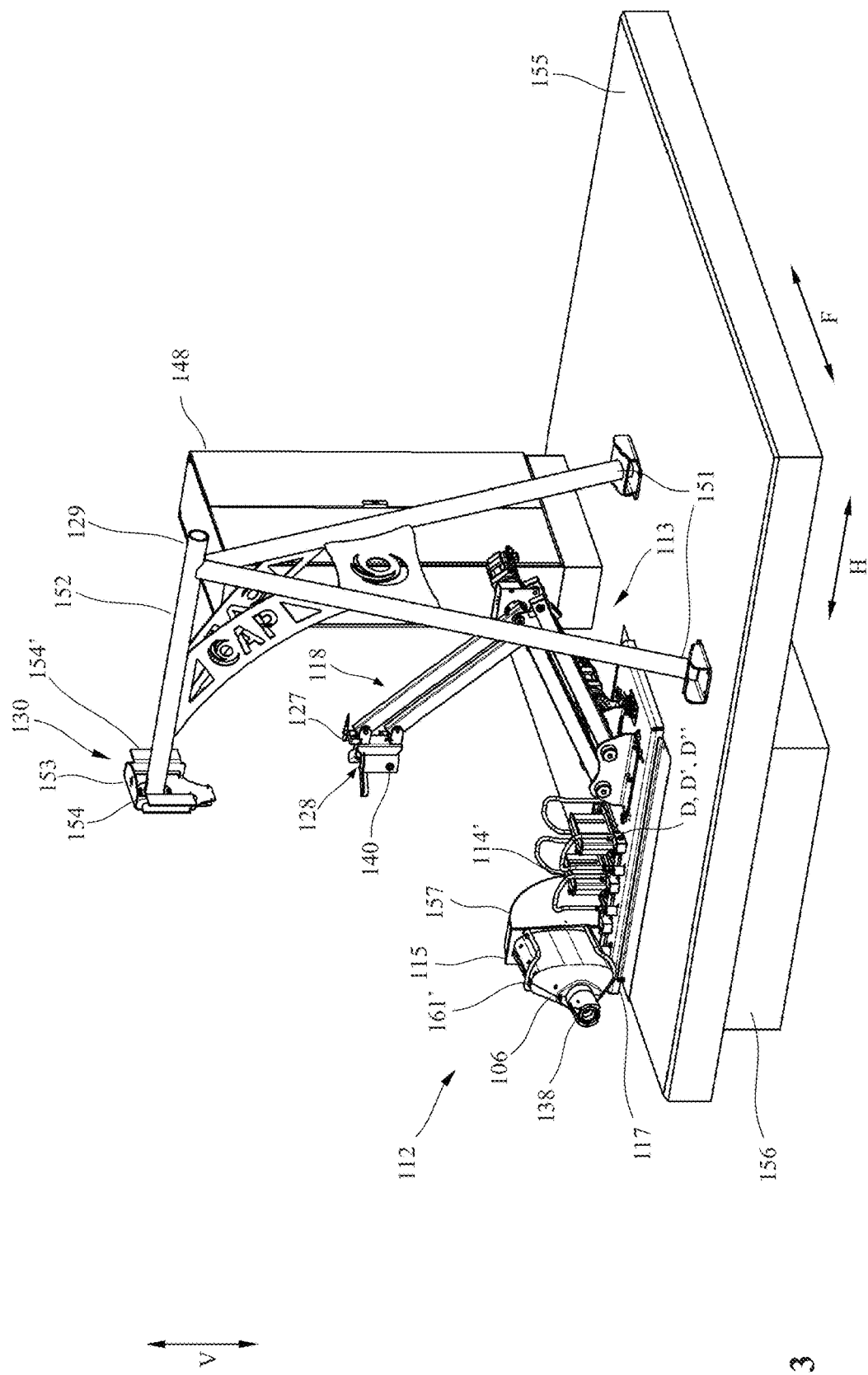
FIG. 13 the view of FIG. 12 with the plug-in connector swiveled out of the rest position.

FIG. 13 shows that by moving the crane 1, not shown, the connector plug 106 with the plug-in connector 114 is again swiveled about the axis of rotation D from the rest position shown in FIG. 12.

The alternative signal mast 129 shown in FIGS. 8 to 13 comprises two slanted legs 151 supporting a boom 152, on the free front end of which an alternative identification plate 130 is to mounted. Similarly, an alternative sensor 111, disposed on the cable guide apparatus 107, is used to detect the identification plate 130. To this end, it is recommended that a distance sensor 111 with a narrow measuring range be used. The identification plate 130 preferably has a central section 153 in the front relative to the horizontal feed direction H, and on both sides, in the travel direction F, adjoining bracket-like sections 154, 154', which, relative to the central section 153, are offset toward the rear in the horizontal feed direction H, i.e., away from the crane 1. The identification plate 130 preferably comprises a reflector, e.g., a reflector foil, in order to reflect the signal emitted by the distance sensor 111 as effectively as possible. Optionally, however, the identification plate 31 of the embodiment example described above can be used as well.

To position the connector plug 106 so as to center it relative to the central section 153, the distance sensor 111, at the beginning of movement in the travel direction F from right or left as seen in FIG. 8, first detects the distance relative to one of the two rear bracketlike sections 154, 154'. As it subsequently travels in the travel direction F further toward the central section 153, it detects, while spatially capturing the central section 153, a sudden decrease in distance and thus the beginning of the central front section 153. Based on the known geometric dimensions, particularly the extension of the central section 153 in the travel direction F, the still required travel length in the travel direction F can be determined in order to position the connector plug 106 as accurately as possible on the gripping device 127.

In this manner, the positioning of the connector plug 106 in relation to the manipulator 118 can be simplified in that an active sensor 111 can be disposed only on the cable guide apparatus 107 while the identification plate 130 can be a passive element. The configuration of the identification plate 130 can be different as long as it is possible for the sensor 111 to detect a clearly defined change in distance. Thus, e.g., the central section can be offset toward the rear, and the bracketlike sections can be closer to the crane 1. More particularly, using the simplified configuration, the bracketlike sections 154, 154' can be omitted so that only the transition from the completely non-reflecting or unsatisfactorily reflecting surroundings to the highly reflective area of the identification plate need be determined. Furthermore, optionally the central section 153 and the adjoining bracketlike sections 154, 154', regardless of whether they are offset with respect to each other in the horizontal feed direction H, can have reflective properties of varying degree so that a differentiation is possible based on the level of the reflected signal strength.

In addition, the configuration according to FIGS. 8 to 28 differs from the configuration shown in FIGS. 2 to 7 with respect to the pivotable plug-in connectors 114. Therefore, the following discussion will again primarily focus on the differences, while the explanations provided in the context of the discussion of FIG. 1 continue to apply to identical or similar components. Thus, unless otherwise specified, because of the identical design of the plug-in connectors 114, 114', 114", the invention will again be described with reference to the plug-in connector 114. These statements also accordingly apply to the other plug-in connectors 114', 114".

Figure 17:
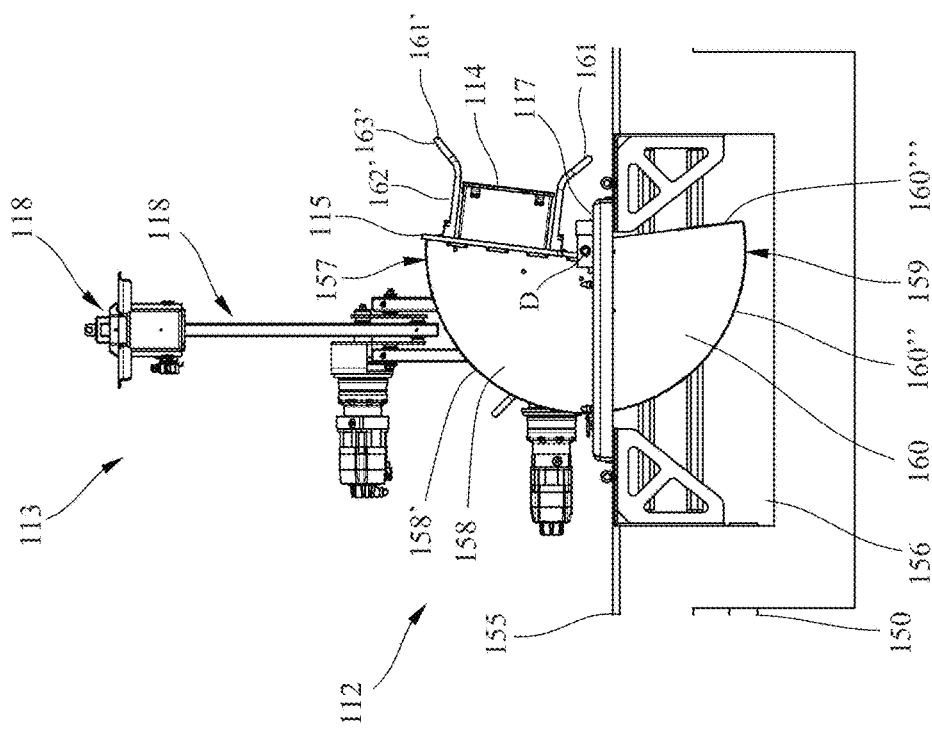
FIG. 17 the lateral view of FIG. 16 with the plug-in connector swiveled out of the rest position as in FIG. 15.
Figure 20:
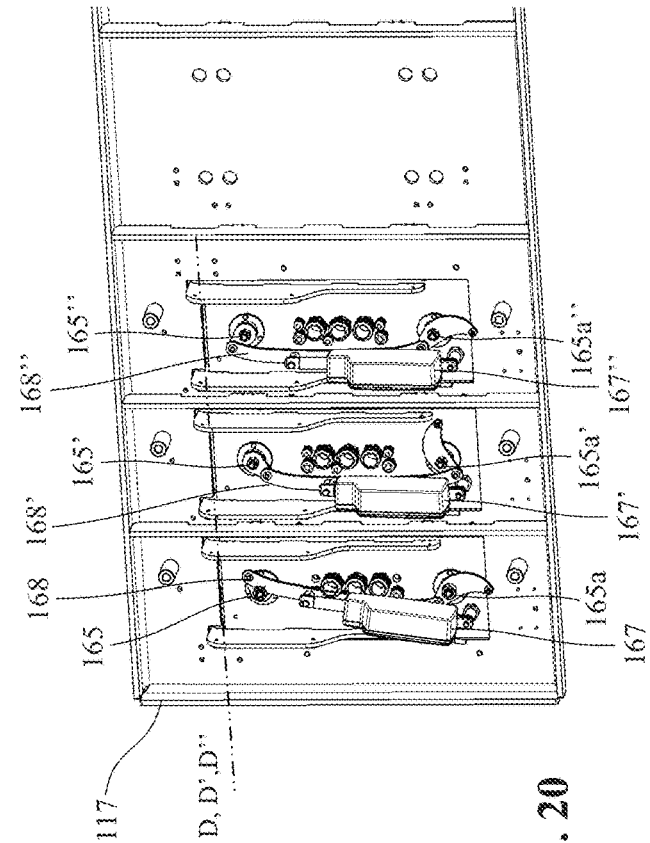
FIG. 20 a schematic detail view of a connector locking mechanism of FIGS. 18 and 19 from below.
Figure 18:
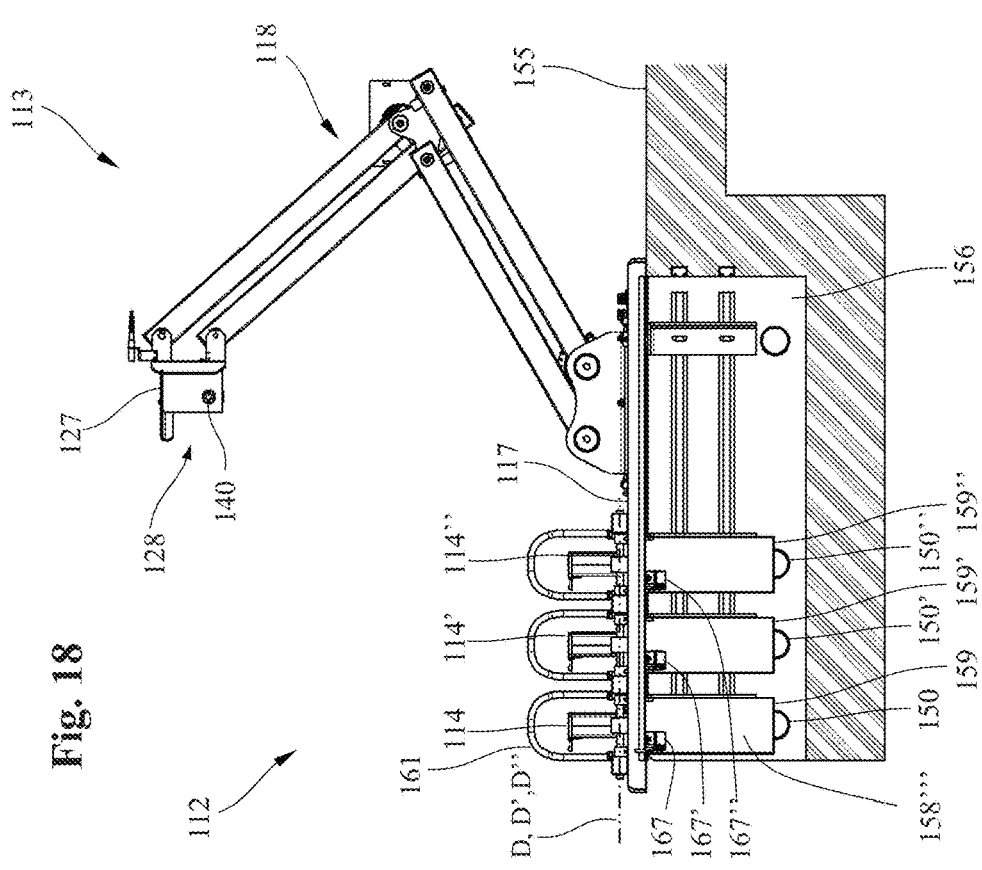
FIG. 18 a lateral view of the partially sectioned representation of the feed device and the connecting apparatus of FIG. 14 viewed from below on left of FIG. 14.

As FIGS. 16 to 18 indicate, the plug-in connector 114 is mounted by means of a swivel plate 115 on a bearing 116 on a mounting plate 117 so as to pivot about an axis of rotation D. However, the plug-in connector 114 could also be pivotably disposed directly on the mounting plate 117. The axis of rotation D extends essentially in the horizontal direction and in the direction of the horizontal feed direction H of the manipulator 118. The mounting plate 117 is disposed above a pit 156 located in the foundation 155. As indicated in FIGS. 16 and 18, the cable conduits 150 coming from the control cabinet 148, which enclose the power supply and data cables 149 shown in FIG. 16, terminate in the pit 156. These cables 149 are each routed through a connecting opening disposed below the plug-in connector 114 in the ground plate 117 to the bottom surface of the plug-in connector 114, where they are electrically connected to the female connector elements of the plug-in connector 114, as indicated in FIG. 20.

To ensure that during swiveling of the plug-in connector 114 the cables 149 disposed on its bottom surface are cleanly guided and encapsulated relative to the surroundings, inter alia, for reasons of protection from electric shock, a first protective enclosure 157, which pivots with the swivel plate 115 about the axis of rotation D, is disposed on the bottom surface of the plug-in connector 114, more particularly on the bottom surface of the swivel plate 115. Adjoining the bottom surface of the swivel plate 115 are identically configured circular segment-shaped side walls 158, 158' measuring approximately 100° as well as a front wall 158" of the first protective enclosure 157, which front wall connects the circular arc surfaces of the side walls 158, 158', as clearly illustrated in FIGS. 15 and 17. A second front face between the side walls 158, 158', the front wall 158" and the swivel plate 115 remains unconnected and forms an opening 158''' visible from the front in FIG. 18 for the cables 149 coming from the cable conduit 150.

Figure 14:
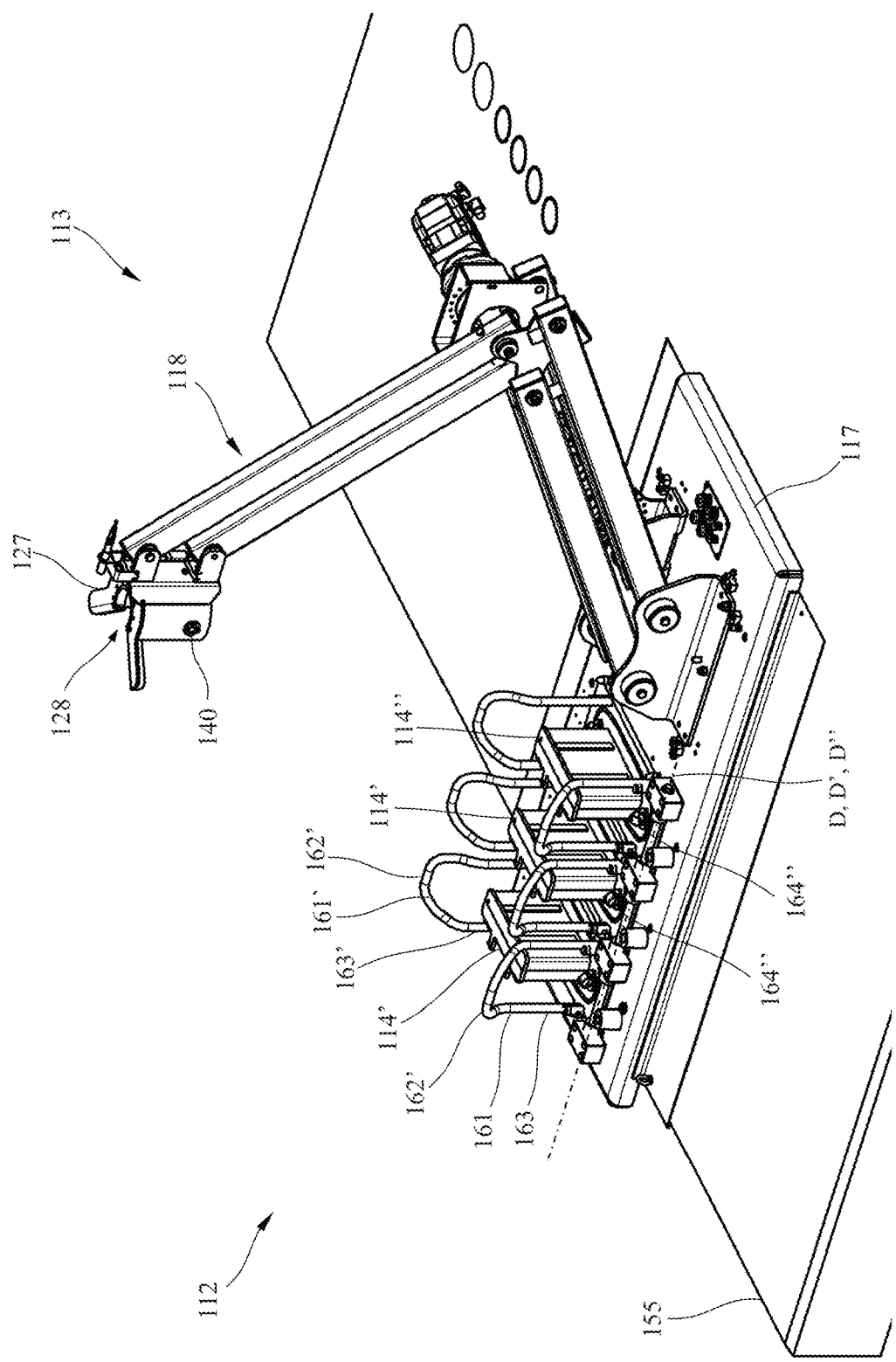
FIG. 14 an enlarged detail view of the feed device and the connecting apparatus of FIG. 9 with the plug-in connector in the rest position.

The first protective enclosure 157 is enclosed in a second protective enclosure 159 which is rigidly attached to the bottom surface of the ground plate 117, said second protective closure having circular segment-shaped side walls 160, 160', a front wall 160" connecting these side walls and an opening 160''' on the front for the cables 149 coming from the cable conduit 150, which second enclosure is slightly larger, but otherwise has the same configuration. Alternatively, the second protective enclosure 159 can be omitted since the first protective enclosure 157 also offers protection for the cables 149 when the swivel plate 115 is lowered, as indicated in FIGS. 14 and 16.

Figure 15:
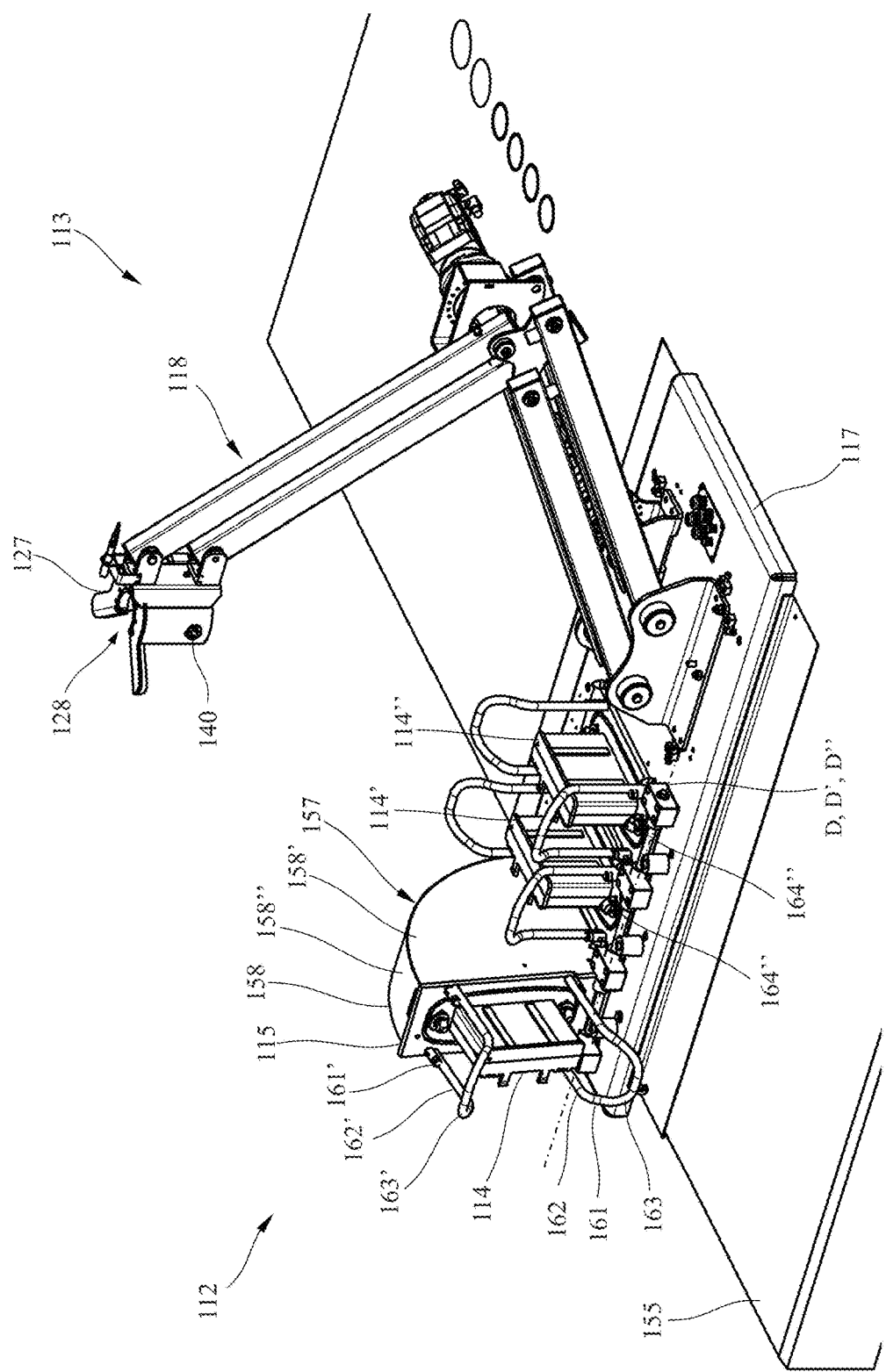
FIG. 15 the detail view of FIG. 14 with the plug-in connector swiveled out of the rest position as in FIG. 13.

The length of the cables 149 is dimensioned in such a way that it is possible for the plug-in connector 114 to assume the completely swiveled-out position as shown in FIGS. 15 and 17. In the completely swiveled-in position of the plug-in connector 114 shown in FIGS. 14 and 16, the excess cable length of the cable 149 preferably folds or coils up inside the protective enclosures 157, 159. Since the cables 149 in the area of the protective enclosures 157, 159 are completely surrounded by said enclosures, the cables 149 can be reliably guided during swiveling of the plug-in connector 114, so that both the risk of damage to the cable 149 and the risk of hindering the movement of the plug-in connector 114 are eliminated. To guide the cables 149, a cable carrier, not shown, is preferably used, which extends along the bottom of the pit 156 and then follows an S-shaped course in the upward direction as shown in FIG. 17.

To compensate for a not quite exact positioning of the connector plug 106 in relation to the plug-in connector 114, a centering bracket 161, 161', respectively, is disposed on the narrow end faces of the swivel plate 115. These centering brackets comprise a lower vertical guide section 162, 162' which is adjoined by an upper oblique feed-in section 163, 163' which faces away from the plug-in connector 114. When the plug-in connector 114 is plugged in, as shown, for example, in FIG. 13, the vertical guide sections 162, 162' enfold the connector plug 106, which improves positioning and, more specifically, pre-centering the connector plug 106 on the plug-in connector 114.

Figure 19:
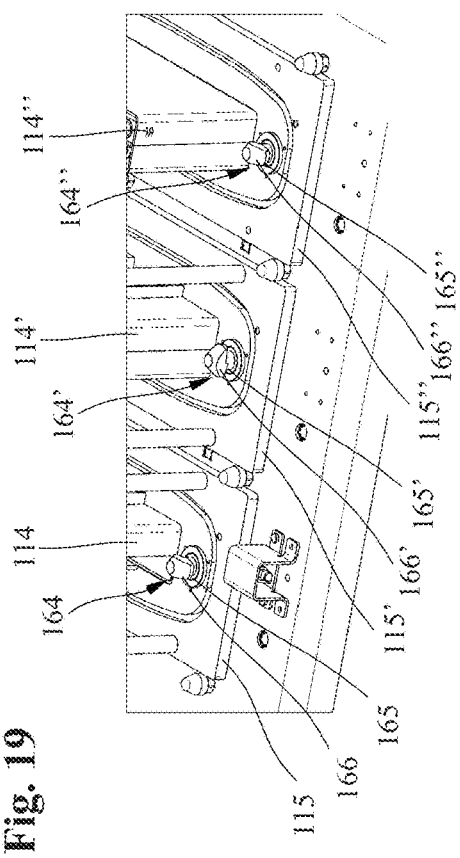
FIG. 19 a schematic detail view of a connector locking mechanism of the connecting apparatus of FIG. 18 viewed obliquely from above.

To prevent an accidental detachment of the connector plug 106 from the plug-in connector 114, which is undesirable especially while power is being transmitted, disposed on the swivel plates 115, 115', 115" along the end faces of the plug-in connectors 114, 114', 114" are plug locking mechanisms 164, 164', 164", which can be especially clearly seen in FIGS. 19 and 20. Because of the identical configuration of the plug locking mechanism 164, 164', 164", again, only the plug locking mechanism 164 will be described unless otherwise specified.

The plug locking mechanism 164 comprises a locking bolt 165 which, in the area of the connector plug 106, passes through the swivel plate 115 and extends upwardly beyond the swivel plate 115 and which comprises an elongated locking head 166. On the opposite front face of the plug-in connector 114, preferably an identically configured locking bolt 165a is disposed, as indicated in FIG. 20.

Figure 24:
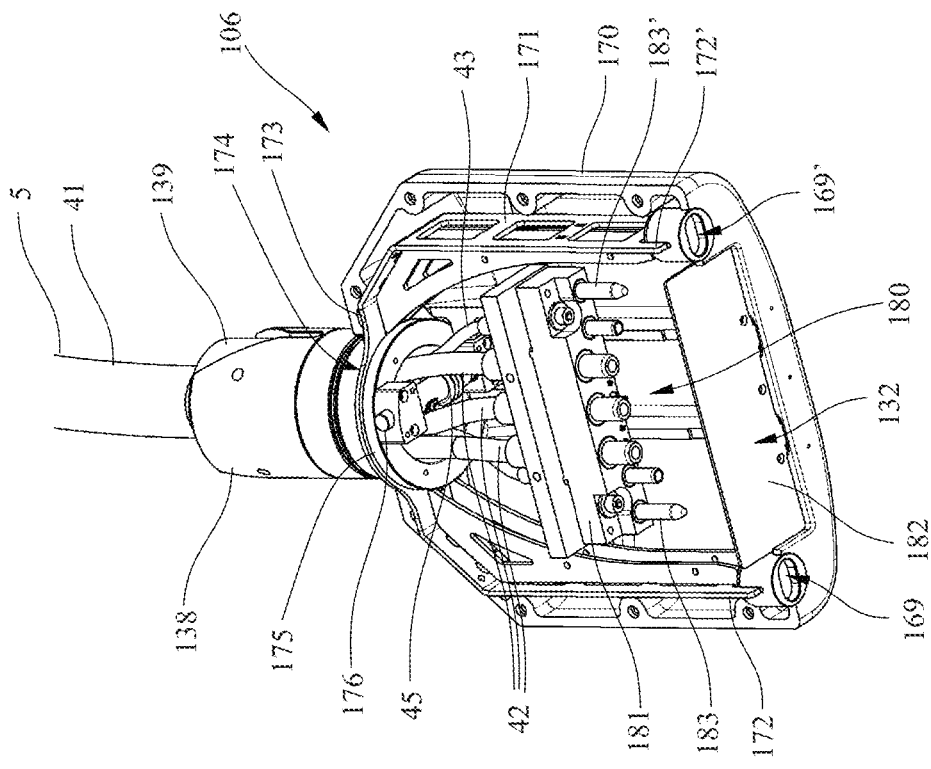
FIG. 24 a schematic three-dimensional view of the connector plug of FIG. 22 from a third oblique perspective from below.

In the open position, the locking head 166 is oriented in such a way that it can pass through a mating locking opening 169 on the connector plug 106, which can be especially clearly seen in FIG. 24.

When the connector plug 106 is fully plugged into the plug-in connector 114, the locking head 166 and the locking head, not shown, of the locking bolt 165a can be simultaneously moved by means of the locking drive 167, shown in FIG. 20, via a lever assembly 168 from an open position, as indicated in FIGS. 19 and 20 by two outer plug-in connectors 114, 114", into a closed position preferably rotated by 90°, as indicated in FIGS. 19 and 20 by the plug-in connector 114' in the middle. Optionally, however, a smaller or larger angle of rotation can be used to ensure a secure lock. Preferably, the locking drive 167 simultaneously drives the locking bolt 165 and the oppositely lying locking bolt 165a via a lever assembly 168.

Instead of a lever assembly 168, a separate locking drive can be provided for each locking bolt 165, 165' 165" and 165a, 165a' 165a", respectively. In principle, each plug-in connector 114, 114', 114" can also have only one plug locking mechanism.

The plug locking mechanism 164 according to the invention also serves to secure the swivel plate 115 to the ground plate 117 if no connector plug 114 is connected. To this end, in the secured position shown in FIGS. 19 and 20, the lower lever arm shown in FIG. 20, which drives the lower rearward locking bolt 165a shown in FIG. 19, engages the ground plate 117 from below, so that the swivel plate 115 cannot be swiveled about the axis of rotation D indicated which extends above the ground plate 117 away from the ground plate 117. In contrast thereto, the fixed position of the middle swivel plate 115' is open, thereby allowing it to be tipped. Alternatively or additionally, a retaining mechanism independent of the plug locking mechanism 164, more specifically, a plug-in connector locking mechanism for the detachable attachment of the plug-in connector 114 in the rest position, can be disposed on the ground plate 117 until the connector plug 114 and the plug-in connector 114 are securely connected to one another.

Another aspect of the invention provides that for the purpose of improving the automatic connecting process, the line cable 5 have a special configuration. In addition, the connector plug 6, 106 can also be specially configured in order to improve the gripping with the manipulator 18, 118 and especially the gripping device 27, 127, and this applies to both embodiment examples described above.

This will now be described in detail with reference to FIGS. 21 to 24.

Figure 21:
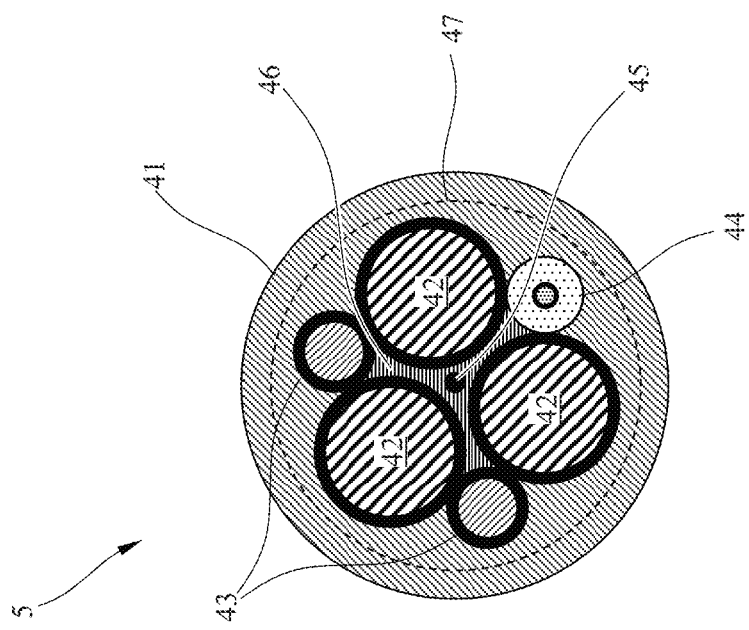
FIG. 21 a cross-sectional view through a line cable.

FIG. 21 shows a cross section through a line cable 5, for example, slightly above the connector plug 106. The line cable 5 comprises an outer casing 41 made of a flexible material, for example, rubber, PVC or another elastic plastic material. The outer casing 41 surrounds three symmetrically disposed phase conductors 42 for the transmission of electric power, a protective conductor divided into two separate conductors 43 and a data transmission conductor 44, especially an optical data transmission conductor. Also disposed in the core of the line cable 5 is a flexible but robust supporting member 45, for example, an aramid rope or a wire rope. The supporting member 45 is surrounded by a filling material and/or molded parts 46 which serve as supports and retainers for the other conductors 42 to 44 of the line cable 5.

This relieves the tension acting on the sensitive conductors 42 to 44 that are disposed in the line cable 5, while the supporting member 45 serves primarily to absorb the longitudinal forces during the winding and unwinding of the line cable 5. Furthermore, an additional tension relief mechanism 46 can be disposed in the outer casing 41, for example, a braided or woven fabric that is embedded in the outer casing 41.

Figure 22:
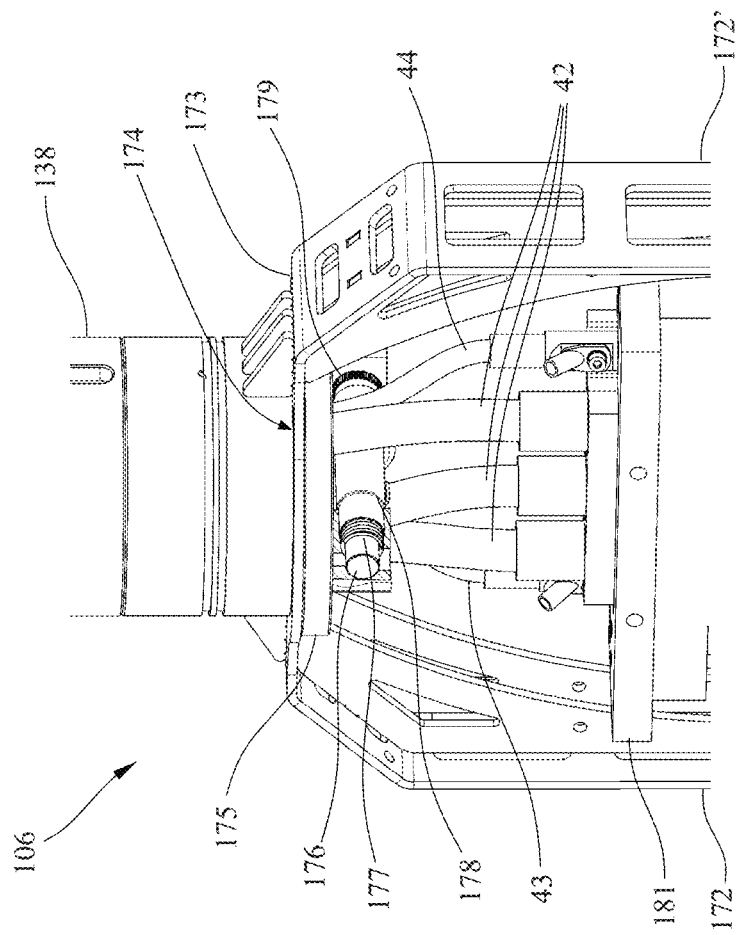
FIG. 22 an enlarged schematic three-dimensional detail view of an open connector plug from a first oblique lateral perspective.
Figure 23:
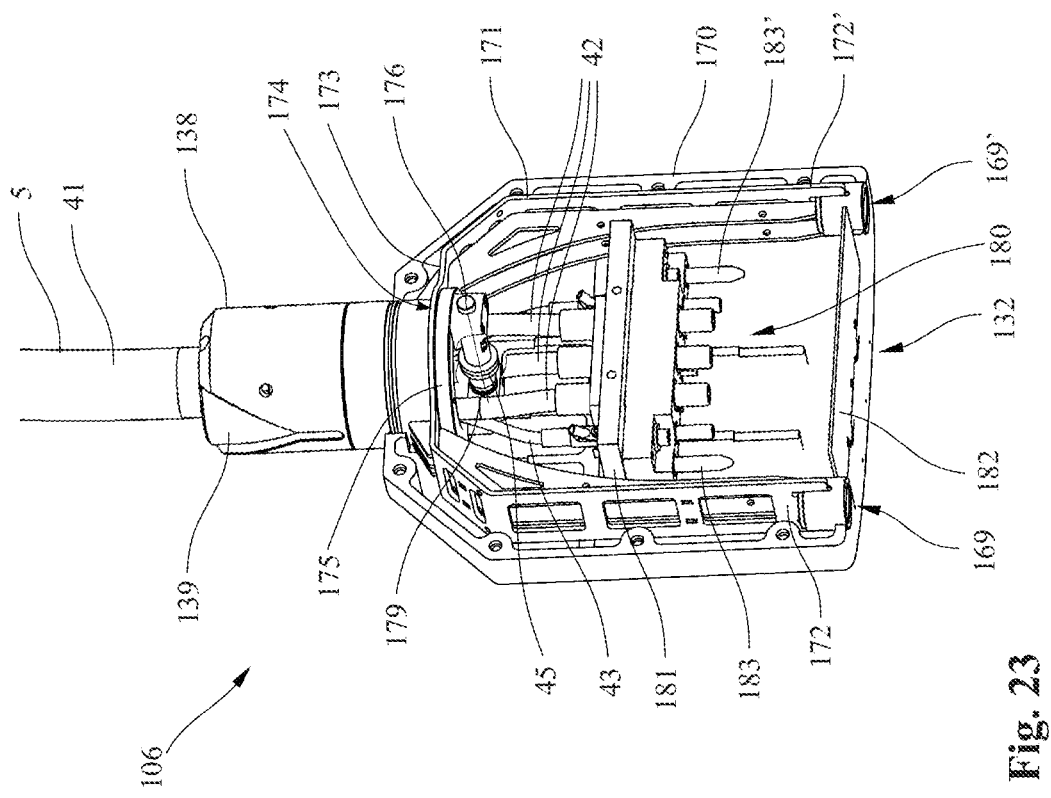
FIG. 23 a schematic three-dimensional view of the connector plug of FIG. 22 from a second oblique lateral perspective.
Figure 26:
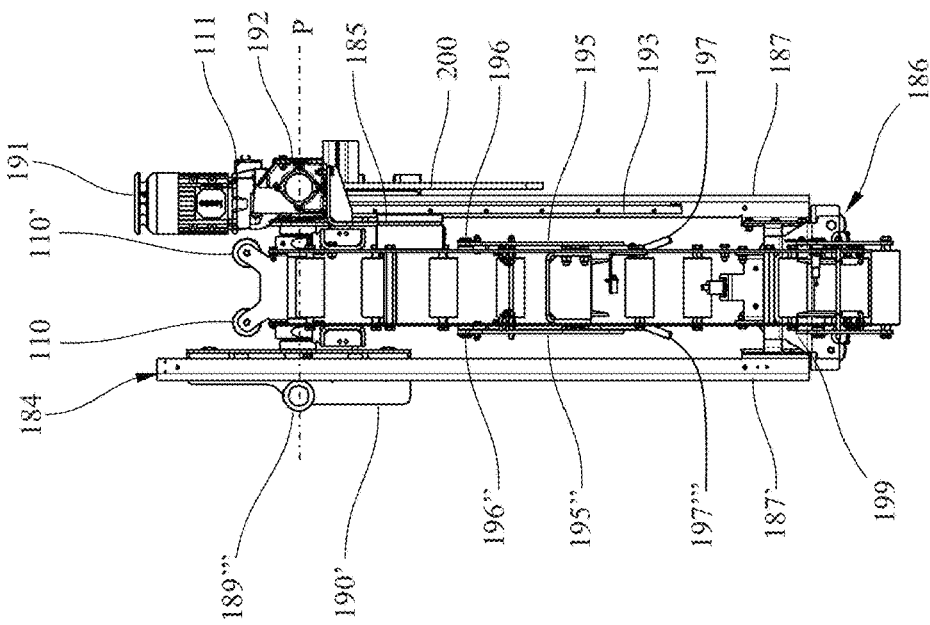

To ensure that the supporting member 45 can serve as a tension relief mechanism, it is mounted, as described below, in the connector plug 106, which in FIGS. 22 to 24 is shown in detail in a partially disassembled state.

The connector plug 106 comprises two connector cover halves, with only the connector cover half 170 shown in FIGS. 22 and 23, while the other half has been omitted in order to show the internal structure of the connector plug 106.

Also provided is an essentially U-shaped supporting frame 171 made of a robust material, preferably of sheet steel, which on each of its free leg ends 172, 172' has the above-mentioned locking opening 169, 169' in the form of oblong holes. The middle section 173 of the supporting frame 171 which connects the free leg ends 172, 172' has a circular opening 174, through which the gripping member 138 of the connector plug 106 is inserted from below, as shown in FIGS. 22 and 23, with the gripping member essentially having the form of a hollow cylinder. The circular segment-shaped outer flange 175 of the gripping member 138 abuts the supporting frame 171, where it is mounted, for example, by means of screws or rivets.

To be able to absorb stresses in the longitudinal direction of the line cable 5, the tension relief mechanism 47 of the outer casing 41 can, on the one hand, be bracketed on the gripping member 138 and/or on the supporting frame 171 (not show). On the other hand, a tensioning bolt 176 extending at right angles to the longitudinal direction of the line cable 5 is disposed on the circular outer flange 175 of the gripping member 138. The tensioning bolt 176 comprises an attachment means, not shown in the drawings, for the supporting member 45, more particularly a through-opening through which supporting member 45 is inserted.

Disposed on the tensioning bolt 176 is a spring element, more particularly a spiral spring 177, which is connected to a surrounding tensioning bolt sheath 178, to which one end of the supporting member 45 is attached. To tension the supporting member 45, the tensioning bolt 176 is first pushed in its axial direction against the pressure of a spiral spring 177 disposed on a stepped end 178 of the tensioning bolt 176 out of an anti-slip means 179 shown in FIG. 22. The tensioning bolt 176 is then turned a plurality of times in the winding direction, so that the supporting member 45 is wound with a plurality of turns on the tensioning bolt 176. To prevent the supporting member 45 from unwinding under stress, the spiral spring 177 subsequently pushes the tensioning bolt 176 back into the anti-slip means 179, which is clearly visible in FIG. 22. Instead of the spiral spring 177, different spring elements can be used, e.g., cup springs, which, after tensioning the supporting member 45, push the tensioning bolt securely back the into anti-slip means 179.

The anti-slip means 179 can preferably comprise a knurled inner bore which cooperates with an equally knurled end of the tensioning bolt 176.

In contrast, the various conductors 42 to 44 are routed unstressed through the circular opening 174 in the supporting frame 171 into the area between the free leg ends 172, 172 of the supporting frame 171 where they are electrically and mechanically connected to the mating male electrical connector elements 180 of the connector plug 106. The individual male connector elements 180 are disposed on a connector support 181, which is stationarily retained in the longitudinal direction extending from the connector plug opening 132 to the gripping member 138, i.e., also in the longitudinal direction of the line cable 5, and is freely floatingly mounted at right angles to said longitudinal direction.

To protect the male connector elements 180 against undesired contact and other external influences, the connector plug opening 132 is covered by means of a protective cover 182. The protective cover 182 is retained by spring action in the closed position shown in FIGS. 21 and 22; however, when the connector plug 106 is plugged into the plug-in connector 114, it can be folded back by the force of the manipulator 118 to move into the area between the free leg ends 172, 172'.

In order to be able to insert the male connector elements 180 of the connector plug 106 into the mating female connector elements (not shown) of the plug-in connector 114, disposed on the connector support 181 are elongated centering bolts 183 with conical ends, which engage in mating centering openings of the plug-in connector 114 (not shown).

FIG. 23 clearly shows the gripping member 138 with the centering funnel 139, the lower end of which, in addition to the version shown in FIGS. 2 to 7, is lengthened in the shape of a slot to form a centering slot. Thus, via the centering pins 140 disposed in the feed-in opening 128 of the gripping device 127, the positions of which are suggested in the drawing, the connector plug 106 can be optimally aligned with the plug-in connector 114 as soon as it is gripped by the gripping device 127.

In addition, as an additional function of the embodiment shown in FIG. 2, an alternative cable guide apparatus 107, details of which are shown in FIGS. 25 to 28, comprises an oscillating link 184 to improve the guidance of the line cable 5, not shown in FIGS. 8 to 20 and 25 to 28. Such oscillating links are basically known in the art, but the novel feature according to the invention is the possibility of linear mobility, more particularly the linear height adjustment, of the oscillating link 184. This serves to allow the oscillating link 184, which during movement of the crane 1 is in the lowermost position, to be moved to the uppermost position and out of the gripping radius of the manipulator 118 for automatically gripping the connector plug 106 by means of the manipulator 118 and to correctly position the connector plug 106.

Figure 27:
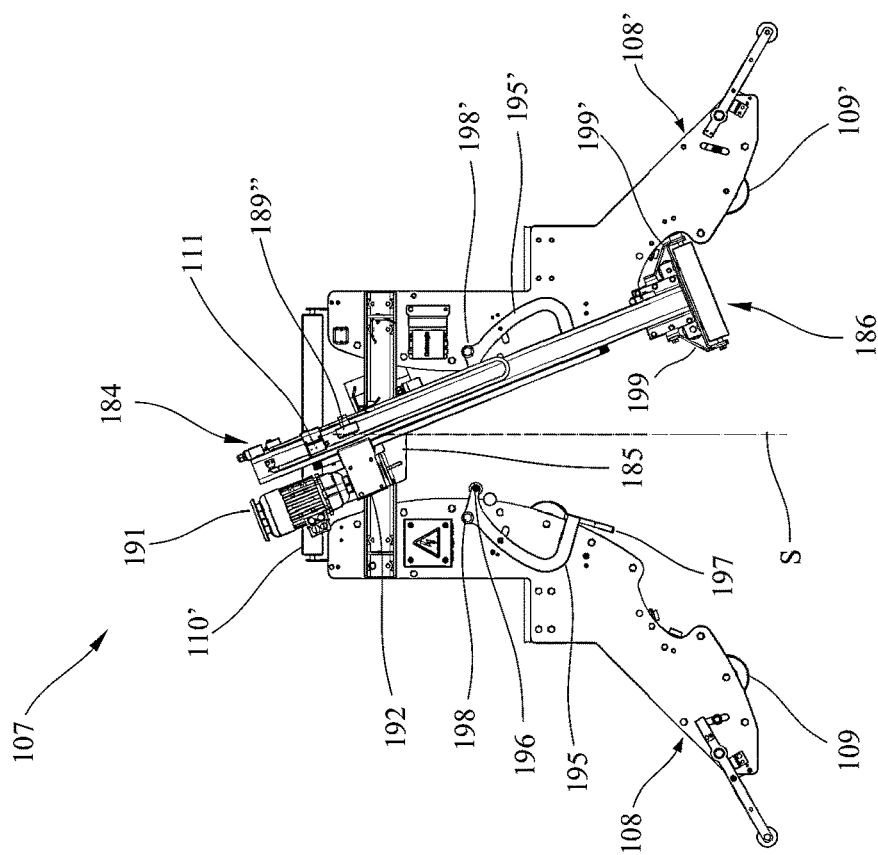
FIG. 27 a front view of the cable guide apparatus of FIG. 25 with a height-adjustable oscillator in a first lower position.

To this end, an oscillator retaining means 185 pivoting about an oscillation axis P which extends essentially in the horizontal direction and at right angles to the travel direction F of the crane 1 is disposed on the cable guide apparatus 107, so that the oscillating link 184 can oscillated back and forth about the oscillation axis P, as clearly visible in FIG. 27.

The deflection of the oscillating link 184 from the vertical S is caused in a manner known in the art by the line cable 5, which, during movement of the crane 1, is being wound and unwound and which passes through a cable guide 186 disposed on the lower end of the oscillating link 184 and having longitudinal and transverse cable guide rollers. Using tautness and slackness sensors known in the art, and not further described here, it is possible to detect whether the line cable 5 is guided tautly or slackly and subsequently, if necessary, to retract or pay out the line cable 5. The line cable 5 is preferably guided by an additional cable guide disposed in the payout direction of the line cable 5 upstream of the cable guide 186 of the oscillating link 184, which additional cable guide is preferably arranged between and/or on the upper end of the two roller bows 108, 108'. The cable guide can preferably be formed by the lateral guide rollers 110, 110', but other methods of guiding the line cable 5 can be used as well.

Figure 25:
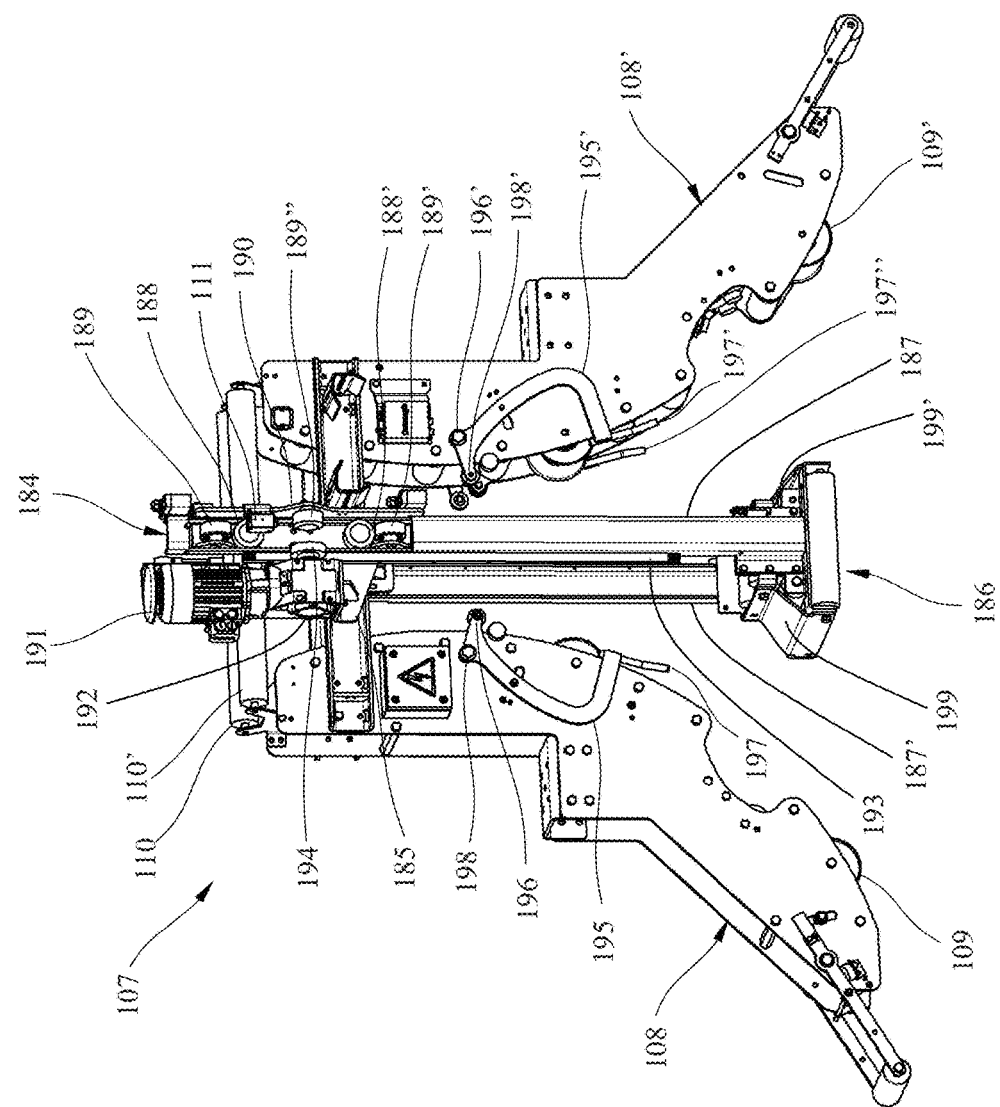
FIG. 25 a schematic three-dimensional view of a cable guide apparatus of FIGS. 9 to 12.
Figure 28:
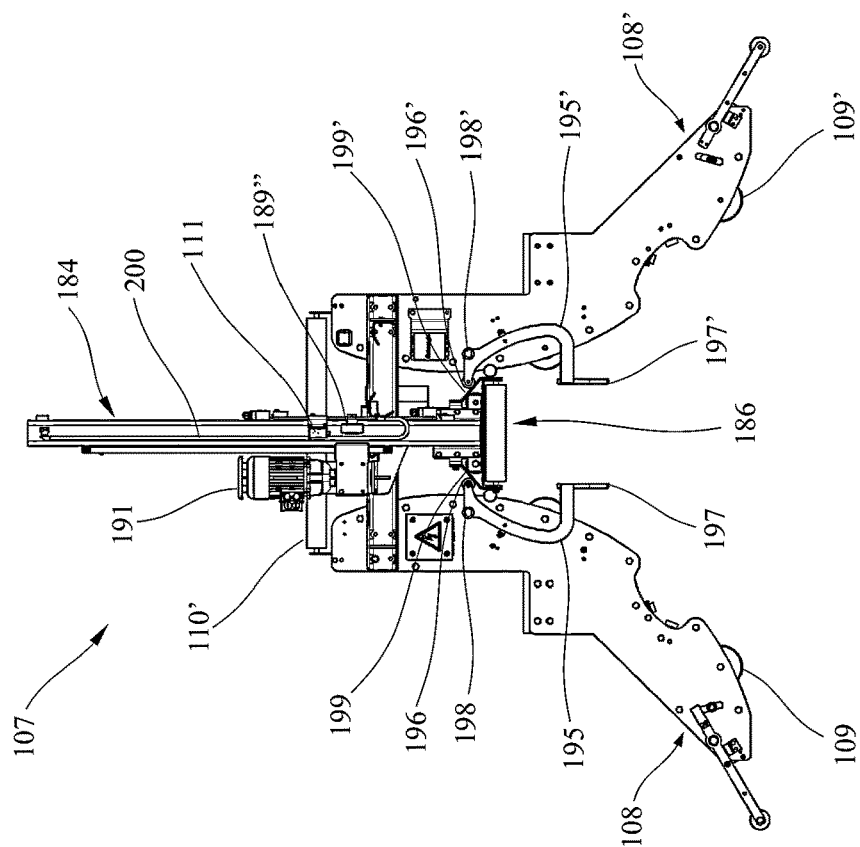
FIG. 28 a front view of the cable guide apparatus of FIG. 25 with the height-adjustable oscillator in a second upper position.

In order to be able to move the oscillating link 184 back and forth between the uppermost and lowermost positions shown in FIGS. 25 and 28, the oscillating link 184 comprises two guide rails 187, 187', shown in a partially broken view in FIG. 25, which have a U-shaped cross section, with their open sides facing one another. The guide rail 187 is guided by means of lateral guide rollers 188, 188' disposed on the oscillator retaining means 185, by means of inside front-end guide rollers 189, 189' and by means of an outside front-end guide roller 189" running on the outside of the middle leg of the guide rail 187. The guide rail 187 is run in parallel on the side of an angled guide plate 190 on which the outside front-end guide roller 189" is disposed. The guide rail 187', which is similarly guided, with FIG. 26 clearly showing the guide plate 190' of the other guide rail 187' with the outside front-end guide roller 189''', is disposed on the side of the cable guide apparatus 107 opposite to the oscillator retaining means 185.

Also disposed on the oscillator retaining means 185 is an oscillator drive, which moves with the oscillating link 184 and which has an electric motor 191, a 90° gearbox 192 and a drive pinion 194 intermeshing with a toothed rack 193, which is disposed on the oscillating link 184. This allows the oscillating link 184 to be moved by a motor in the longitudinal direction toward and away from the oscillator retaining means 185. Alternatively, a direct linear drive or a toothed belt drive can be used to retract and extend the oscillating link 184.

In order to be able to cleanly position the connector plug 106 for the gripping device 127 in the cable guide apparatus 107, the oscillating link 184 moves completely to the top, as shown in FIGS. 8 to 11 and 28. At the same time or afterwards, the connector plug 106 is pulled via the line cable 5 to the uppermost position to reach the cable guide 186 of the oscillating link 184.

In order to be able to further improve the positioning of the connector plug 106 for gripping by the manipulator 118 in the cable guide apparatus 107, oppositely lying retaining brackets 195, 195' are disposed on the roller bows 108, 108'. The retaining brackets 195, 195' pivot about essentially horizontal axes of rotation 196, 196' that extend at right angles to the travel direction F and comprise downwardly extending rod-shaped retaining extensions 197, 197', 197", 197''', which, in the upper position shown in FIGS. 8 and 28, adjoin the connector plug 106, thereby preventing the connector plug 106 from twisting or moving aside while it is being gripped by the gripping device 127.

In general, the retaining brackets 195, 195' are retained by the action of a spring in the open retracted position, as shown in FIGS. 12, 25 and 27, on the roller bows 108, 108'.

Only when the oscillating link 184 is moved into the upper retaining position shown in FIGS. 8 to 11 and 28 the stop rollers 198, 198' on the upper, shorter lever arms of the retaining brackets 195, 195' strike mating stops 199, 199' of the cable guide 186, so that the lower, longer, approximately L-shaped inwardly bent lever arms of the retaining brackets 195, 195' are moved toward each other and to the connector plug 106. The retaining brackets 195, 195' can also have a different configuration; the only essential requirement is that, as the oscillating link 184 or possibly also the connector plug 106 as such is actuated, the retaining brackets 195, 195' are moved to make contact with the connector plug 106.

As indicated in FIG. 27, the cable guide stops 199, 199' also serve as actuating elements for the tautness sensors, here not described in detail, when the oscillating link 184 is pulled into its laterally completely deflected position.

In the present case, the above-described sensor 111 is preferably disposed on the oscillating link 184, where it is supplied with current via an energy chain 200 and technically connected in terms of data to the controller of the crane. However, the sensor 111 can also be disposed at a point of the cable guide apparatus 107 or even on the crane 1 and be wirelessly connected to the controller.

Figure 30:
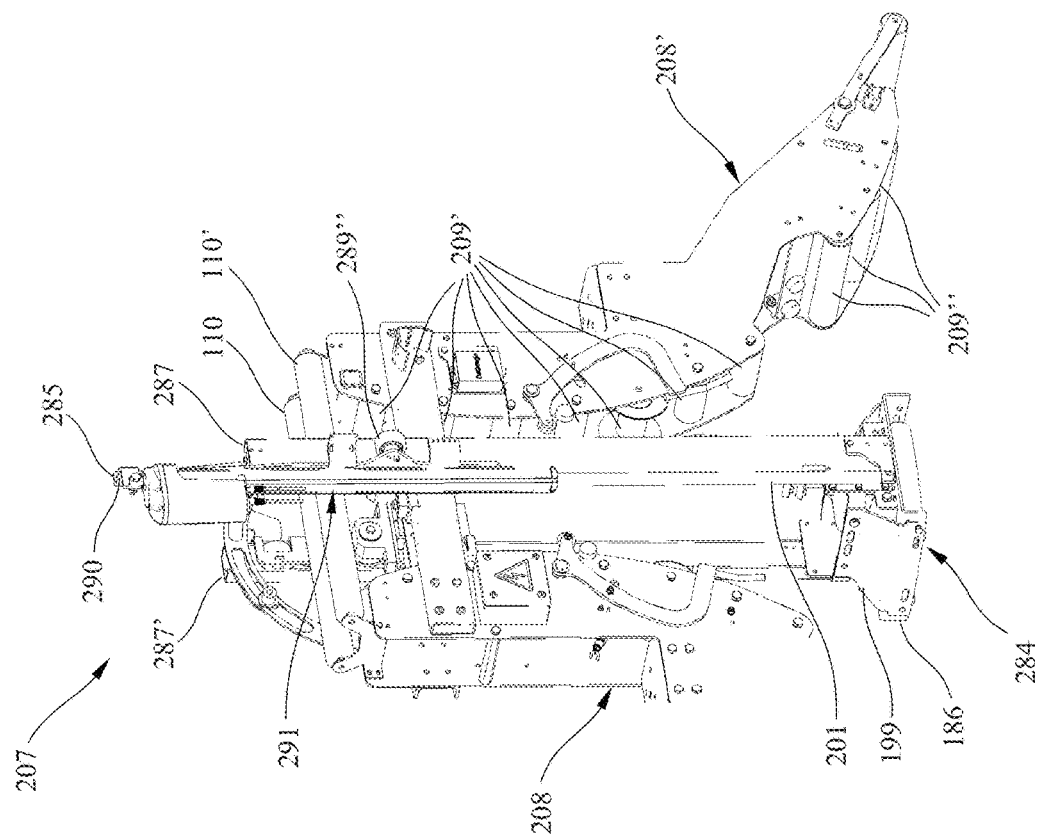
FIG. 30 a portion of the schematic three-dimensional view of FIG. 29 from a different perspective.
Figure 29:
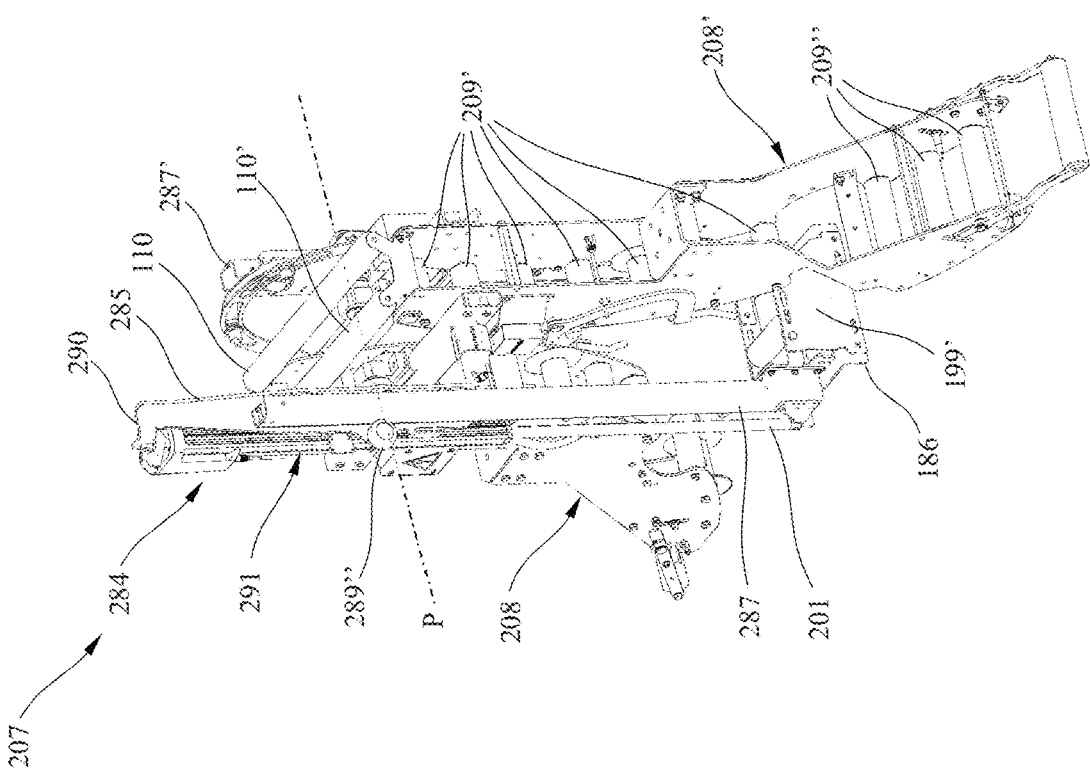
FIG. 29 a schematic three-dimensional view of an alternative cable guide apparatus.

FIGS. 29 and 30 show an alternative configuration of a cable guide apparatus 207 which essentially differs in two aspects from the configuration shown in FIGS. 25 to 28, i.e., the design of the roller bows 208, 208' and the longitudinal guide rollers 209, 209' and 209", on the one hand, and an alternative drive 291 of an oscillating link 284. Therefore, identical reference characters, with the addition of the numeral "200," will again be used for the cable guide apparatus 207. Again, the focus is on the differences, so that, unless otherwise specified, the explanations relating to components of the first configuration in FIGS. 2 to 7 and the second configuration as in FIGS. 8 to 28 also correspondingly apply to the configuration shown in FIGS. 29 and 30.

The outer longitudinal guide rollers 209" in the outer lower area of the roller bow 208' are wider than the inner longitudinal guide rollers 209' of the roller bow 208' disposed in the inner upper area of the roller bow 108'. The advantage is that if the line cable 5 is paid out not completely parallel to the travel direction F of the crane 1, the line cable 5 can be laterally offset slightly more in the outer area of the roller bows 208, i.e., when looking at the cable guide apparatus 207 from above, the line cable 5 can be oriented slightly obliquely relative to the longitudinal direction of the roller bows 208'. To this end, the frame of the roller bow 208' on its outer lower outwardly facing end preferably has two oppositely lying walls, between which the longitudinal guide rollers 209" are mounted, which walls are spaced at a greater distance from one another than the walls in the area of the inner narrower longitudinal guide rollers 209'. The design of the second roller bow 208 is correspondingly reversed; otherwise, the explanations relating to the roller bow 208' correspondingly apply.

In addition, instead of the rotary electric motor 191 shown in FIGS. 25 to 28, a direct linear drive 291 is used to move the oscillating link 284 in the longitudinal direction. To this end, the oscillator retaining means 285 is slightly lengthened upwards, as is the angled guide plate 290. The driving element of the linear drive 291 is preferably supported by the angled guide plate 290 and the oscillator retaining means 285, and a moving piston rod 201 of the linear drive 291 is mounted on the moving part of the oscillating link 284. The output end of the piston rod 201 can preferably be disposed on the lower end of the moving part of the oscillating link 284, as shown in FIGS. 29 and 30, especially on a U-shaped guide rail 287. To actuate the oscillating link 284, the piston rod 201 is moved upwardly.

As described in detail above, by means of the connecting apparatus 13, 113 according to the present invention, the connector plug 6, 106 of the line cable 5 can be simply and automatically connected to the feed device 12, 112, without having to manually insert or remove the connector plug 6, 106. Another aspect of the invention provides that, for the purpose of improving the automatic connecting process, the line cable 5 be specially configured. In addition, the connector plug 6, 106 can also be specially configured in order to improve the gripping with the manipulator 18, 118 and especially the gripping device 27, 127. Also, to simplify automatic gripping of the line cable 5 and the connector plug 106, a height-adjustable oscillating link 284 can be provided. According to another aspect of the invention, the line cable 5 is guided so as to protect the cable.

The feed direction H preferably extends toward and away from the cable guide apparatus 7, 107 and 207 and the crane 1 and preferably at right angles to the travel direction F. In another embodiment, not shown, the manipulator 18 and 118 and/or the gripping device 27 and 127 can, however, also be moved in the travel direction F in order to compensate, if necessary, for an offset in the travel direction F. The manipulator 18 and 118 and/or the gripping device 27 and 127 can also be designed to move about a vertical axis so as to better compensate for an angular offset, e.g., in case of an obliquely positioned cable guiding apparatus 7, 107 and 207.

LIST OF REFERENCE CHARACTERS

1 Container crane (E-RTG)
2 Container
3, 3' Wheels
4 Cable drum
5 Line cable
6; 106 Connector plug
7; 107; 207 Cable guide apparatus
8, 8'; 108, 108'; 208, 208' Roller bow
9, 9'; 109, 109'; 209, 209', 209" Longitudinal guide rollers
10, 10', 110, 110' Lateral guide rollers
11; 111 Sensor unit
12; 112 Feed device
13; 113 Connecting apparatus
14, 14'; 14", 114, 114', 114" Plug-in connectors
15, 15'; 115, 115', 115" Connecting member (swivel plate)
16, 16'; 116 Bearing for the connecting member
17; 117 Mounting plate
18; 118 Manipulator
19 Manipulator base
20 Lower manipulator arm
21, 21', 21" Lower sub-arms
22 Lower manipulator drive
23 Cross-shaped connecting piece
24 Upper manipulator arm
25, 25' Upper sub-arms
26 Upper manipulator drive
27; 127 Gripping device
28; 128 Funnel-shaped feed opening
29; 129 Signal mast
30; 130 Identification plate
31 Signal light
32; 132 Connector plug opening
33, 33' Connector housing
34, 34' Cover
35, 35' Hinges for the cover
36, 36' Opening tabs for the cover
37, 37' Stop for the swivel plate
38, 138 Gripping member, connector plug
39, 139 Centering funnel
40, 140 Centering pins 41 Outer casing
42 Phase conductor
43 Protective conductor
44 Data transmission conductor
45 Supporting member
46 Filling material, molded parts
47 Tension relief mechanism
148 Control cabinet
149 Power supply and data cable
150, 150', 150" Cable conduits
151 Legs
152 Boom
153 Central section, identification plate
154, 154' Bracketlike sections, identification plate
155 Foundation
156 Pit
157, 157', 157" First movable protective enclosures
158, 158', 158", 158'" Side wall, front wall, opening in 1st protective enclosure
159, 159', 159" Second rigid protective enclosures
160, 160', 160", 160'" Side walls, front wall, opening in 2nd protective enclosure
161, 161' Centering bracket
162, 162' Vertical guide section, centering bracket
163, 163' Oblique feed-in section, centering bracket
164, 164', 164" Plug locking mechanism
165, 165', 165" Locking bolt
165a, 165a', 165a" Locking bolt
166, 166', 166" Elongated locking head
167, 167', 167" Locking drive
168, 168', 168" Lever assembly
169, 169' Elongated locking openings
170 Connector cover half
171 U-shaped supporting frame
172, 172' Leg ends
173 Supporting frame, middle section
174 Circular opening supporting frame
175 Outer flange gripping member
176 Tensioning bolt
177 Spiral spring
178 Stepped end of the tensioning bolt
179 Anti-slip means
180 Male connector elements, connector plug
181 Connector support
182 Protective cover
183 Elongated centering bolts
184; 284 Oscillating link
185; 285 Oscillator retaining means
186 Cable guide
187, 187'; 287, 287' U-shaped guide rails
188, 188' Lateral guide rollers
189, 189', 189", 189'"; 289" Inside and outside front-end guide rollers
190, 190'; 290 Angled guide plate
191; 291 Electric motor (rotary), linear drive
192 90° gearbox
193 Toothed rack
194 Drive pinion
195, 195' Retaining bracket
196, 196' Retaining bracket, axes of rotation
197, 197' Retaining extensions
198, 198' Stop rollers
199, 199' Cable guide stops
200 Energy chain
201 Piston rod, linear drive
D Horizontal axis of rotation, connecting member
F Travel direction, crane
H Horizontal feed direction, manipulator
P Oscillation axis, oscillating link
S Vertical of the oscillating link
V Vertical feed direction, manipulator

The invention claimed is:

1. A cable guide apparatus for a line cable which is extendable and retractable from a reservoir disposed on an electrical load which travels in a travel direction, the cable guide apparatus comprising an oscillating link with a cable guide for the line cable, the oscillating link pivotably disposed about an oscillation axis, wherein the oscillating link is movable in a linear direction with respect to the oscillation axis from an extended position relative to the oscillation axis to a retracted position relative to the oscillation axis.

2. The cable guide apparatus of claim 1, wherein the oscillation axis extends at a right angle to the travel direction.

3. The cable guide apparatus of claim 1, further comprising at least one roller bow with at least one of sliding and rolling elements disposed thereon configured for guiding the line cable in the travel direction.

4. The cable guide apparatus of claim 3, wherein the at least one roller bow comprises a first roller bow and a second roller bow opposite to the first roller bow in the travel direction.

5. The cable guide apparatus of claim 3, wherein the at least one of the sliding and rolling elements have different widths, with width increasing in a payout direction of the line cable.

6. The cable guide apparatus of claim 1, further comprising a second cable guide for the line cable, the second cable guide, in a payout direction of the line cable, disposed upstream of the cable guide of the oscillating link.

7. The cable guide apparatus of claim 1, further comprising a drive on the oscillating link configured for linear movement of the oscillating link with respect to the oscillation axis.

8. The cable guide apparatus of claim 7, wherein the drive comprises a linear drive.

9. The cable guide apparatus of claim 8, wherein the linear drive comprises at least one of an electric linear motor and a belt drive.

10. The cable guide apparatus of claim 7, wherein the drive comprises a toothed rack disposed on the oscillating link and a rotary motor with a drive pinion which meshes with the toothed rack.

11. The cable guide apparatus of claim 1, further comprising at least one retaining element configured for holding a connecting element, the at least one retaining element disposed on an end of the line cable and disposed on the cable guide apparatus.

12. The cable guide apparatus of claim 11, wherein the at least one retaining element comprises a first lever arm which, in a retracted position of the connecting element, rests against the connecting element on the cable guide apparatus.

13. The cable guide apparatus of claim 12, wherein the at least one retaining element comprises a stop, which, upon retraction of the connecting element into the cable guide apparatus, comes to rest against at least one of the connecting element and the cable guide of the oscillating link and moves the first lever arm so as to rest the first lever arm against the connecting element.

14. The cable guide apparatus of claim 11, wherein the at least one retaining element is held in an open position and configured for reception of the connecting element on the cable guide apparatus.

15. The cable guide apparatus of claim 14, wherein a spring holds the at least one retaining element in the open position.

16. A power supply system for supplying at least one of electrical power and data to a movable electrical load via cables, the power supply system comprising a feed device and a connecting element of a line cable of the movable electrical load, the connecting element connectable to the feed device, wherein the line cable is paid out and retracted from a reservoir, which is run in parallel to the movable electrical load, in accordance with a distance between the reservoir and the feed device, wherein a connecting apparatus for connection of the connecting element of the line cable to a connector of the feed device is provided, wherein the cable guide apparatus of claim 1 is disposed on the movable electrical load.

17. The power supply system of claim 16, wherein the reservoir is a motor-driven cable drum.

18. A method for connecting a line cable disposed on an electrical load to a feed device relative to which the electrical load is movable, wherein the line cable is paid out and retracted from a reservoir, which is run in parallel to the electrical load, in accordance with a distance between the reservoir and the feed device and guided by a cable guide of an oscillating link, which is pivotally mounted about an oscillation axis on a cable guide apparatus, the method comprising:

retracting a connecting element disposed on the line cable into the cable guide apparatus and prior thereto, at the same time, or afterwards, moving the oscillating link in a linear manner from the extended position to the retracted position in relation to the oscillation axis.

19. The method of claim 18, further comprising:
positioning the connecting element in relation to the feed device;
gripping at least one of the connecting element and the line cable with a manipulator of a connecting apparatus; and
connecting the connecting element to a connector of the feed device by use of the manipulator.

20. A cable guide apparatus for a line cable which is extendable and retractable from a reservoir disposed on an electrical load which travels in a travel direction, the cable guide apparatus comprising an oscillating link with a cable guide for the line cable;
wherein the oscillating link is pivotably disposed about an oscillation axis and movable, in a linear direction with respect to the oscillation axis, from a first lower position to a second upper position; and
wherein the first lower position is configured for movement of the line cable with the electrical load and the second upper position is configured for positioning of a connecting element for connecting with a connector of a feed device.

* * * * *